US010277733B1

(12) United States Patent
DeMaio et al.

(10) Patent No.: US 10,277,733 B1
(45) Date of Patent: *Apr. 30, 2019

(54) SINGLE WINDOW TESTING OF AN INTERACTIVE CONTACT WORKFLOW

(71) Applicant: Amazon Technologies, Inc., Seattle, WA (US)

(72) Inventors: Pasquale DeMaio, Bellevue, WA (US); Joseph Daniel Sullivan, Seattle, WA (US); David Adam Philips, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/940,018

(22) Filed: Mar. 29, 2018

Related U.S. Application Data

(63) Continuation of application No. 15/463,426, filed on Mar. 20, 2017, now Pat. No. 9,961,191.

(51) Int. Cl.
*H04M 1/24* (2006.01)
*H04M 3/08* (2006.01)
*H04M 3/22* (2006.01)
*H04M 3/24* (2006.01)
*H04M 3/493* (2006.01)

(52) U.S. Cl.
CPC .......... *H04M 3/242* (2013.01); *H04M 3/493* (2013.01); *H04M 2201/42* (2013.01); *H04M 2203/056* (2013.01)

(58) Field of Classification Search
USPC .......................................... 379/10.03, 32.01
See application file for complete search history.

(56) References Cited

U.S. PATENT DOCUMENTS

| 7,881,440 | B2 | 2/2011 | Castillo et al. |
| 8,009,811 | B2 | 8/2011 | Sharma |
| 9,961,191 | B1* | 5/2018 | DeMaio ................ H04M 3/242 |
| 9,961,192 | B1* | 5/2018 | DeMaio ................ G06Q 10/06 |
| 2002/0006186 | A1 | 1/2002 | Sanders |
| 2002/0077819 | A1 | 6/2002 | Girardo |
| 2004/0008825 | A1 | 1/2004 | Seeley et al. |
| 2008/0304632 | A1 | 12/2008 | Catlin et al. |
| 2011/0150189 | A1 | 6/2011 | Kulkarni |

* cited by examiner

*Primary Examiner* — Quoc D Tran
(74) *Attorney, Agent, or Firm* — Lowenstein Sandler LLP

(57) ABSTRACT

An interactive contact workflow system provides a graphical representation of a contact workflow in a graphical user interface (GUI). The system displays a first visual indicator that graphically highlights a first visual display object to indicate that a first instruction block is active. The system executes the first instruction block and outputs a first prompt via a communication interface, the communication interface to simulate a telephone communication with the interactive contact workflow system. The system receives a first response to the first prompt from a GUI element, identifies a first command to execute a second instruction block based at least in part on the first response to the first prompt, and displays a second visual indicator that graphically connects the first visual display object to a second visual display object within the GUI, the second visual display object corresponding to the second instruction block of the interactive contact workflow system.

20 Claims, 14 Drawing Sheets

SINGLE WINDOW TESTING OF AN INTERACTIVE CONTACT WORKFLOW

RELATED APPLICATIONS

This application is a continuation of U.S. application Ser. No. 15/463,426, filed Mar. 20, 2017, the entire contents of which are hereby incorporated by reference. This application is related to U.S. application Ser. No. 15/463,522, filed on Mar. 20, 2017.

BACKGROUND

Interactive voice response (IVR) is a technology that allows a computer system to interact with a human caller through the use of dual tone multi-frequency touchtone input via the keypad of a telephone. Similar methods of allowing a computer system to interact with a human (or "contact") electronically include chat/chatbot interactions, Simple Message Service (SMS)/Text message interactions, and email interactions. A contact workflow is a collection of instruction blocks that can be linked together to facilitate these types of interactions. Contact workflows are commonly implemented using proprietary scripting languages without the benefit of a robust interactive development platform. Additionally, testing of contact workflows can sometimes involve high risk procedures that typically expose the contact workflow to a live conventional communication channels (such as a live telephone number) that may be accessible to public use. Embodiments discussed herein provide technical solutions to problems introduced by these types of testing procedures.

BRIEF DESCRIPTION OF THE DRAWINGS

The embodiments described herein will be understood more fully from the detailed description given below and from the accompanying drawings. The drawings should not be taken to limit the application to the specific embodiments, but are for explanation and understanding only.

DETAILED DESCRIPTION

Figure 1:
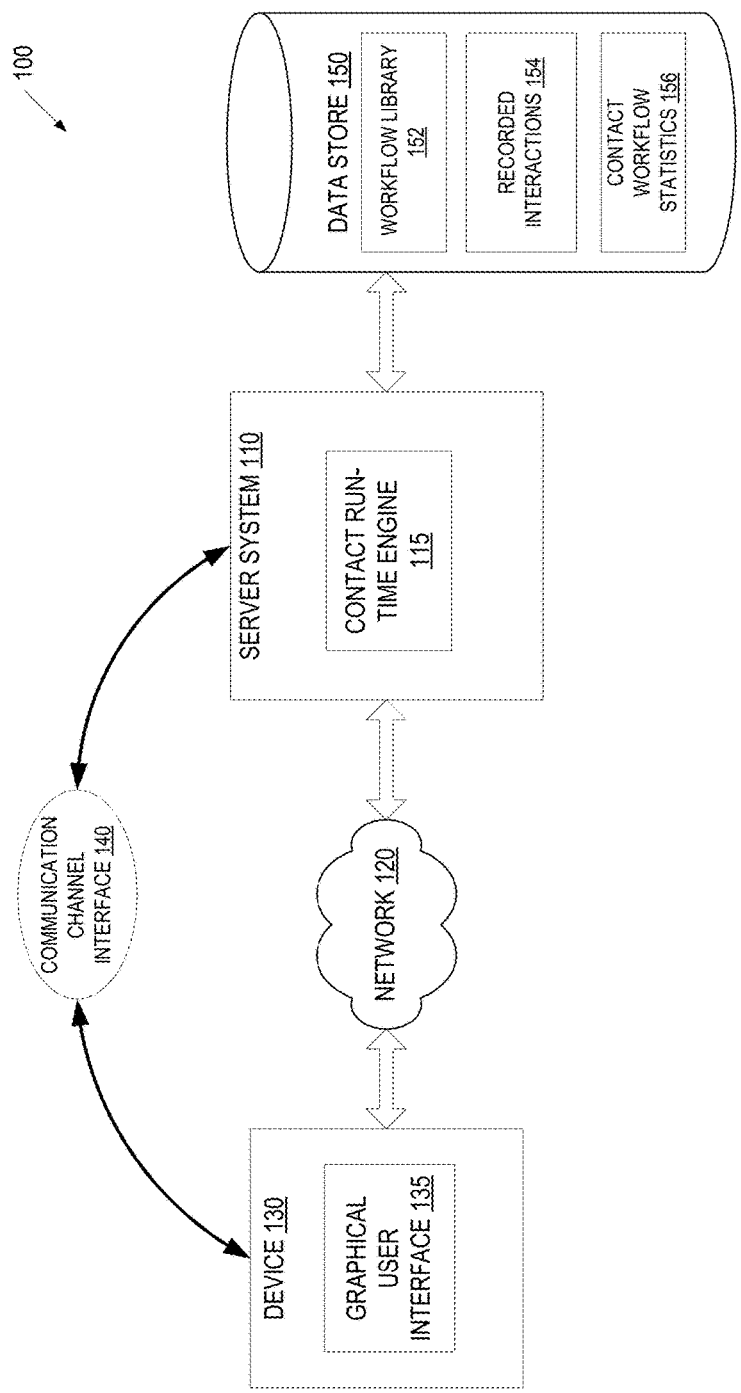
FIG. 1 is a block diagram of an example network architecture including an interactive contact run-time engine, in accordance with one embodiment.

Embodiments described herein relate to providing a testing platform for interactive contact workflows such as Interactive Voice Response (IVR) workflows without requiring a conventional communication connection such as a telephone. In one embodiment, a contact run-time engine provides an interactive run-time environment to enable a user to test a contact workflow using a graphical user interface (GUI). The instruction blocks of the contact workflow may be presented as visual display objects within the GUI, providing the user with a visual representation of the contact workflow as it executes. Executing instruction blocks may be highlighted in the GUI to provide a user with visual indications of which blocks are active and which are not. Thus, the contact run-time engine can provide a more robust testing vehicle for contact workflow development.

Conventional testing of a contact workflow (such as an IVR workflow) can involve starting the workflow from its entry point (e.g., the beginning of the workflow) each time a test is conducted. This can be particularly inefficient when a user intends to test instruction blocks within a contact workflow that are positioned after the entry point. The contact run-time engine of the present disclosure provides the user with the ability to select a starting point for a test by interacting with the display elements of the contact run-time environment GUI. Any environmental parameters needed by the selected instruction blocks may be entered by the user to eliminate the need to start the contact workflow at its entry point.

Once execution of a contact workflow is initiated, the contact run-time engine generates a communication interface (e.g., a softphone interface, chat interface, text message interface, etc.) that connects the executing contact workflow with the GUI so that the user may provide responses to prompts generated by the contact workflow without requiring the use of a dedicated conventional communication channel (e.g., a telephone line for an IVR). Thus, security for development and/or testing of contact workflows is dramatically improved because the risk of exposure of a contact workflow to a publically available communication channel (e.g., a publically available telephone number) is eliminated.

In another embodiment, the contact run-time engine can replay a previously recorded interaction with contact workflow. This can provide the ability to test a new version of a workflow as well as examine an error encountered by a caller. The contact run-time engine can present the recorded interaction within the GUI so that a user may step through the recorded call, and replay the responses entered by the caller. Additionally, the GUI allows a user to replay a call from any point with in a contact workflow so that the user should not need to start it from the entry point. Thus, the time needed for contact workflow problem resolution may be dramatically reduced.

In another embodiment, the contact run-time engine can access a data store of previously recorded interactions with a contact workflow to generate statistical information for the information collected by the contact workflow over a period of time. When a contact workflow is displayed, a statistical distribution of information collected may be may be presented to graphically illustrate the observed traffic for that particular workflow. For example, when an IVR workflow is displayed, a statistical distribution of recorded responses for each of the prompts within the IVR workflow may be presented to graphically illustrate the observed traffic for that workflow. Thus, branches of a contact workflow that are seldom used may be easily identified, simplifying the management and monitoring of actual contact activity for that contact workflow.

FIG. 1 is a block diagram of an example network architecture 100 in which embodiments described herein may operate. The network architecture 100 may include server system 110 and device 130 capable of communicating with server system 110 via a network 120. Network 120 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network 120 may have any suitable communication range associated therewith and may include, for example, public networks (e.g., the Internet), metropolitan area networks (MANs), wide area networks (WANs), local area networks (LANs), or personal area networks (PANs). In addition, the network 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Device 130 may include any type of mobile computing device (e.g., that has a finite power source) or traditionally non-portable computing device. Device 130 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), and so on. Device 130 may also be a traditionally non-portable computing device such as a desktop computer, a server computer, or the like. Device 130 may be configured with functionality to enable execution of an application to interact with an in interactive contact run-time environment, such as that provided by contact run-time engine 115 of server system 110. In some implementations device 130 can include graphical user interface (GUI) 135 that interacts with contact run-time engine 115. In one embodiment GUI 135 may be component of a standalone application that executes on device 130. Alternatively, GUI 135 may be a component of a web browser enabled application that executes within a browser window that is active on device 130.

Communication between the server system 120 and the device 130 may be enabled via any communication infrastructure, such as public and private networks. One example of such an infrastructure includes a combination of a wide area network (WAN) and wireless infrastructure, which allows a user to use device 130 to interact with contact rune-time engine 115 without being tethered to the server system 110 via hardwired links. The wireless infrastructure may be provided by one or multiple wireless communications systems. One of the wireless communication systems may be a Wi-Fi access point connected with the network 120. Another of the wireless communication systems may be a wireless carrier system that can be implemented using various data processing equipment, communication towers, etc. Alternatively, or in addition, the wireless carrier system may rely on satellite technology to exchange information with the device 130.

Server system 110 may be set up by an entity such as a company or a public sector organization to provide one or more services (such as various types of cloud-based computing or storage) accessible via the Internet and/or other networks to device 130. Server system 110 may include numerous data centers hosting various resource pools, such as collections of physical and/or virtualized computer servers, storage devices, networking equipment and the like, needed to implement and distribute the infrastructure and services offered by the server system 110, including to provide multi- and single-tenant services. In some embodiments, server system 110 may implement a contact run-time engine 115 and associated services, provide other computing resources or services, such as a virtual compute service and storage services, such as object storage services, block-based storage services, data warehouse storage service, archive storage service, data store 150, and/or any other type of network based services (which may include various other types of storage, processing, analysis, communication, event handling, visualization, and security services, such as a code execution service that executes code without client management of the execution resources and environment). Device 130 may access these various services offered by server system 110 via network 120, for example through an application programming interface (API) or a command line interface (CLI). Likewise network-based services may themselves communicate and/or make use of one another to provide different services.

Server system 110 may include a contact run-time engine 115 which can receive requests from device 130 to load a contact workflow into an interactive contact run-time environment, and provide graphical elements of the contact workflow for display in GUI 135 of client device 130. In one embodiment, a contact workflow may be an IVR workflow (for interactive voice/telephonic communication). Alternatively, a contact workflow may be a workflow for providing interaction with a customer contact using a different communication channel such as interactive chat, Short Message Service (SMS)/text messaging, email, or other similar communication channels.

In various embodiments, contact run-time engine 115 may facilitate testing, and/or debugging of a contact workflow without requiring a conventional communication channel interface for the workflow interactions. For example, contact run-time engine 115 may facilitate testing of an IVR workflow without requiring a conventional phone line for the IVR interactions. Similarly, contact run-time engine 115 may facilitate testing a chat workflow without requiring a conventional online chat interface with a live customer contact. In other embodiments, contact run-time engine 115 may facilitate testing of a workflow without conventional SMS/Text, email, or other similar communication channel interfaces.

Server system 110 may provide contact runtime engine 115 with access to data store 150 that stores workflow library 152, recorded interactions 154, and contact workflow statistics 156. Workflow library 152 may include a stored library of previously created workflows (e.g., IVR workflows, chat workflows, SMS workflows, etc.) that may be loaded into the interactive contact run-time environment of contact run-time engine 115. In some implementations, a contact workflow may be made up of multiple instruction blocks, where each instruction block may include a prompt (e.g., an audio voice recording prompt) to be provided to a caller, as well as one or more commands to be executed based on the response provided by the caller to the prompt. In some implementations, the instruction block may not include a prompt, but may include commands and/or instructions that can be executed based on data collected during previously executed instruction blocks or other environmental parameters captured by contact run-time engine 115 rather than in response to a prompt. In some workflows, a command may initiate another instruction block within the contact workflow.

Recorded interactions 154 may include data for previously recorded/captured interactions between contacts and a contact workflow. For example, for IVR workflows, recorded interactions 154 may include response data for previously recorded/captured interactions between callers and an IVR workflow that is accessible to a caller by the use of a publicly available telephone number associated with the workflow. Similarly, for chat workflows, recorded interactions 154 may include online chat correspondence between a customer contact and the chat workflow. The recorded interactions 154 may include a version number/identifier for the workflow, an identifier for each of the instruction blocks in the workflow, an identifier for each of the prompts (if present) that were played for a caller, the response provided by the caller to each prompt, a listing of the order of the prompts encountered by a caller (e.g., the workflow path of a caller), or any similar information.

Contact workflow statistics 156 may include generated statistical summary information for various elements of the recorded interactions 154. As described in further detail below, contact workflow statistics 156 may store a statistical distribution of information collected by each instruction block within a workflow. In some implementations, contact workflow statistics 156 may store a statistical distribution of the responses provided for a prompt in an IVR workflow over a specified period of time. For example, for a prompt that has three possible acceptable response values, IVR statistics may store the percentage of callers that selected the first response value, the percentage of callers that selected the second response value, and the percentage of callers that selected the third response value. The information stored in contact workflow statistics 156 may be displayed by contact run-time engine 115 to graphically illustrate the historical call traffic over time for a particular IVR workflow.

In one embodiment, contact run-time engine 115 may receive a request from device 130 to load a contact workflow from a stored library of contact workflows (e.g., workflow library 152). Contact run-time engine 115 may then provide a graphical representation of the contact workflow for display in the GUI 135 of device 130. In some implementations, the contact workflow may be provided so that the instruction blocks of the workflow are presented as visual objects within the GUI 135. For example, each instruction block may be displayed as a box that includes a description of the prompt (if present) for that instruction block as well as any acceptable values for responses to that prompt. Additionally, an instruction block that includes a command to execute a second instruction block may be displayed with an arrow or connector line between the box representing the first instruction block and the box representing the second instruction block. Examples of the graphical representation of an IVR workflow are described below with respect to FIGS. 3A-5.

Contact run-time engine 115 may then receive a request from the device 130 to execute an instruction block of the contact workflow within the contact run-time environment. In some implementations, the contact workflow may be initiated from the beginning of the contact workflow (e.g., the "entry point" of the workflow). Alternatively, the contact workflow may be initiated from any instruction block within the workflow. For example, to test a portion of a workflow without executing the entire workflow from the beginning, a particular instruction block may be selected and the contact workflow may be initiated from that instruction block. In such implementations, any environmental parameters that may be needed by the starting instruction block may be entered manually into the GUI 135. For example, if an the first instruction block in an IVR workflow prompts a user for an account number, then subsequently executing instruction blocks may rely on the account number being present in the system. Thus, if a subsequent instruction block is selected for testing, a user may enter the account number into the system so that the subsequent instruction block does not encounter an error condition due to a missing account number.

Contact run-time engine 115 may then generate a communication channel interface 140 between the contact run-time engine 115 and the device 130. Communication channel interface 140 may be a software program that simulates a communication channel using network 120 between the contact run-time engine 115 and the device 130 without the use of conventional communication channels (e.g., telephone, chat channel, SMS/text capability, etc.) For example, in implementations for IVR workflows, communication channel interface 140 may be a software program that simulates a telephone connection between two endpoints without the use of a conventional public switched telephone network (PTSN) connection (e.g., a softphone interface). In such implementations, communication channel interface 140 may be used to facilitate simulated telephonic communication between device 130 and IVR run-time engine 115.

In some implementations, communication channel interface 140 may be established using Web Real-Time Communication (WebRTC) protocols to establish endpoints at the device 130 and the service system 110 to enable a the GUI 135 of device 130 the ability to conduct simulated telephonic interactions (or chat interactions, SMS/text interactions, email interactions, etc.) with the contact run-time engine 115 through network 120 (e.g., through the Internet). The communication channel interface 140 may provide audio prompts to an output interface of the device 130 as if it were being transmitted to the speaker headset of a telephone. Additionally, the communication channel interface 140 may receive input from the device 130 as if it were entered via the touchtone keypad of telephone or spoken into the microphone of a telephone. Similarly, communication channel interface may receive input from device 130 as if it were typed into a chat application window (e.g., for chat workflows), an SMS/text message window (e.g., for SMS/text workflows), etc.

Contact run-time engine 115 may then begin execution of the contact workflow from the selected starting instruction block. When an instruction block begins execution (e.g., is the active block), contact run-time engine 115 may provide a visual indicator for display within GUI 135 that graphically highlights the executing instruction block to indicate that it is active. In some implementations, contact run-time engine 115 may provide the visual indicator by sending a notification to the device 130 to cause the GUI to display the visual indicator. For example, the GUI 135 may receive the visual indicator and, in response, highlight the active instruction block in a bold color so that it is visually distinguished from the other instruction blocks in the contact workflow. If the instruction block includes an audio prompt, the audio prompt may be sent to the audio output of device 130 via communication channel interface 140. For example, an audio prompt may be "Enter 1 for support. Enter 2 for sales."

Subsequently, contact run-time engine 115 may receive a response to the prompt from the client device 130 via communication channel interface 140 (e.g., either via a keypad GUI element that simulates the touchtone keypad of a telephone, via a microphone of the client device 130, via a chat window, via an SMS/text window, etc.). Contact run-time engine 115 may then use the response to identify a command that executes another instruction block in the contact workflow. Using the above IVR workflow prompt example, if contact run-time engine 115 receives a response of '1', it may then identify a command to execute the instruction block in the IVR workflow associated with a "support" function. Additionally, contact run-time engine 115 may provide a visual indicator for display within the GUI that graphically connects the prompt instruction block and the "support" instruction block. As noted above, contact run-time engine 115 may provide the visual indicator by sending a notification to the device 130 to cause the GUI to display the visual indicator. For example, the GUI 135 may receive the visual indicator and, in response, highlight the connector line between the two instruction blocks within the display. As the user proceeds through the contact workflow, the active instruction block may be highlighted, and any visual indicators may be removed from any inactive blocks (e.g., the highlighting may be removed so that only the active block is highlighted). Similarly, as each response is received, contact run-time engine 115 can provide visual indicators to device 130 to cause GUI 135 to highlight the corresponding connector lines within the workflow to highlight the execution path.

In another embodiment, contact run-time engine 115 may replay a previously stored interaction with contact workflow (e.g., a previously captured interaction that was processed by the contact workflow). For example, contact run-time engine 115 may replay a previously captured customer call that was processed by a live IVR workflow. As noted above, contact run-time engine 115 may access recorded interactions 154 in data store 150 to obtain stored response data for previously recorded contact workflow interactions. After receiving a request to load a contact workflow and displaying the contact workflow in GUI 135, contact run-time engine 115 may then receive a request to load response data for a previously recorded interaction with the contact workflow. Contact run-time engine 115 may then load the response data so that it is accessible to the interactive contact run-time environment and replay the contact workflow using the stored data.

In another embodiment, contact run-time engine 115 may calculate statistical information associated with a contact workflow and provide that information for display in GUI 135 with the associated contact workflow. After receiving a request to load a contact workflow and providing the contact workflow for display in GUI 135, contact run-time engine 115 may then receive a specified time period during which interactions with the contact workflow were previously recorded. Contact run-time engine 115 may then identify any previously recorded interactions during the specified time period and calculate statistical information that indicates a distribution of values for data collected (e.g., captured responses to workflow prompts) across the identified previously recorded interactions. As noted above, for a prompt of an IVR workflow that has three possible acceptable response values, contact run-time engine 115 may determine the percentage of callers that selected the first response value, the percentage of callers that selected the second response value, and the percentage of callers that selected the third response value.

Contact run-time engine 115 may then display the statistics to graphically illustrate the historical interaction traffic over time for a particular contact workflow. Contact run-time engine 115 may generate the statistics upon request, or alternatively, may generate the statistics using a background operation and subsequently store the statistics in contact workflow statistics 156 for later use. Once calculated, contact run-time engine 115 may provide the statistics for display with the contact workflow in GUI 135. For example, contact run-time engine 115 may provide the statistical information with information associated with elements of the contact workflow so that the different percentage values may be displayed in close proximity to the corresponding contact workflow elements (e.g., the response values in the instruction block associated with an IVR prompt).

Figure 2:
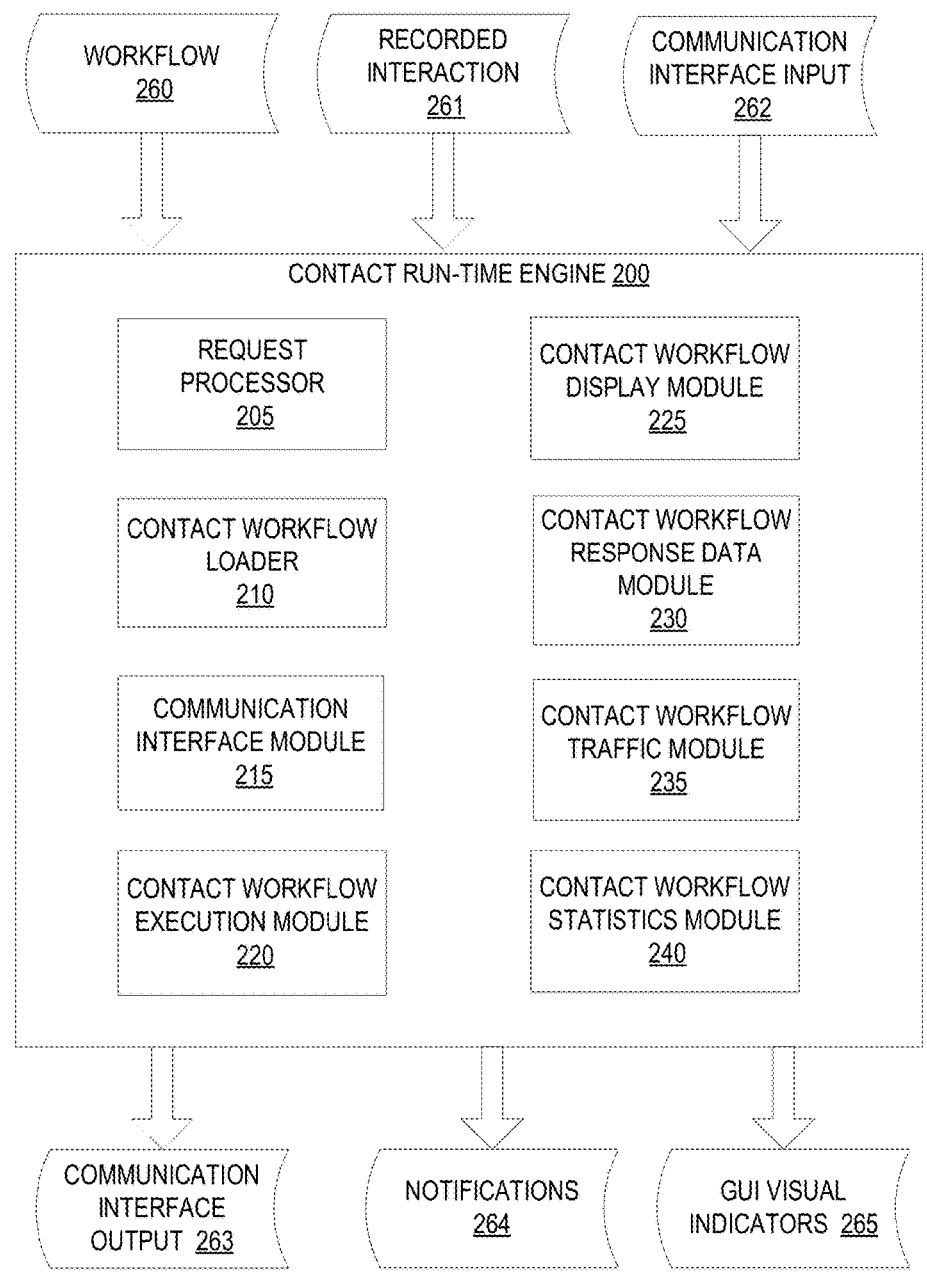
FIG. 2 is a block diagram of a logical view of an interactive contact run-time engine, in accordance with one embodiment.

FIG. 2 is a block diagram of a logical view of a contact run-time engine 200, in accordance with one embodiment. Contact run-time engine 200 may correspond to the contact run-time engine 115 of FIG. 1. In some embodiments contact run-time engine 200 may include request processor 205, contact workflow loader 210, communication interface module 215, contact workflow execution module 220, contact display module 225, contact workflow response data module 230, contact workflow traffic module 235, and contact workflow statistics module 240.

In one embodiment, contact run-time engine 200 may facilitate testing and/or debugging a contact workflow (e.g., an IVR workflow, a chat workflow, an SMS/text workflow, etc.) without a conventional communication channel interface. For example, contact run-time engine 200 may facilitate testing of an IVR workflow without a conventional telephone interface. Similarly, contact run-time engine 200 may facilitate testing of an chat workflow without a conventional chat communication channel interface.

Request processor 205 can receive a request from a client device (e.g., device 130 of FIG. 1) to load a contact workflow from a stored library of contact workflows (e.g., contact workflow library 152 of FIG. 1). As noted above, a contact workflow can include multiple instruction blocks, where an instruction block may include an audio prompt and a command to execute a second instruction block based the value of a response to the audio prompt. Alternatively, an instruction block may include commands to be executed based on information associated with the execution of the workflow without an associated prompt. For example, an instruction block may include a command to execute another instruction block based on the value of a data element received by a previously executed instruction block (e.g., and account number, social security number, or other similar stored parameter), based on an environmental setting (e.g., a date/timestamp, elapsed time, etc.), or the like.

Request processor 205 may receive the request from the graphical user interface (GUI) presented to the client device by IVR run-time engine 200. In some implementations, request processor 205 may receive a workflow identifier associated with a particular contact workflow entered by a user into the GUI. For example, the user may enter the identifier into an input field element of the GUI. Alternatively, the GUI may present a list of available contact workflows that may be loaded, and a user may make a selection from the list. Request processor 205 may then invoke contact workflow loader 210 to load workflow 260 from the workflow library into the interactive contact run-time environment.

Contact workflow display module 225 may be invoked to provide a graphical representation of the IVR workflow for display in the GUI of the IVR run-time environment. In some implementations, the IVR workflow may be provided so that the instruction blocks of the workflow are presented as visual objects within the GUI. For example, each instruction block may be displayed as a box that includes a description of the prompt (if present) for that instruction block as well as any acceptable values for responses to that prompt. Additionally, an instruction block that includes a command to execute a second instruction block may be displayed with an arrow or connector line between the box representing the first instruction block and the box representing the second instruction block.

Request processor 205 may subsequently receive a request from the client device to execute an instruction block of the contact workflow. In some implementations, the contact workflow may be initiated from the beginning of the contact workflow (e.g., the "entry point" of the workflow). Contact workflow execution module 220 may be invoked to send a notification 264 to the client device to request a starting instruction block to execute within the contact workflow. For example, the notification may cause the GUI to present a dialog window that can allow a user to specify the entry point as the starting instruction block (e.g., displaying a message such as "Start testing from entry point"). Contact workflow execution module 220 may then receive a confirmation from the client device to set the starting instruction block to the entry point at the beginning of the contact workflow.

Alternatively, the contact workflow may be initiated from any instruction block within the workflow. For example, to test a portion of a workflow without executing the entire workflow from the beginning, a particular instruction block may be selected and the contact workflow may be initiated from that instruction block. Contact workflow execution module 220 may receive a notification from the client device that a particular instruction block has been selected by a user within the GUI. Contact workflow execution module 220 may then, as above, send a notification 264 to the client device to request a starting instruction block to execute within the contact workflow. For example, the notification may cause the GUI to present a dialog window that can allow a user to specify the selected instruction block as the starting instruction block (e.g., displaying a message such as "Start testing from selected block"). Contact workflow execution module 220 may then receive a confirmation from the client device to set the starting instruction block to the selected block.

In some implementations, any environmental parameters that may be needed by the starting instruction block may be entered manually by the user into the GUI. Contact workflow execution module 220 may identify an environmental parameter for the starting instruction block, and send a notification to the client device to provide a value for that environmental parameter. Contact workflow execution module 220 may receive the value for the environmental parameter entered by the user and store the value for use by the starting instruction block. The value may be stored in a memory space accessible to the contact run-time engine 200, in a data store, or the like. For example, if an the first instruction block in an contact workflow prompts a user for an account number, then subsequently executing instruction blocks may rely on the account number being present in the system. Thus, if a subsequent instruction block is selected for testing, a user may enter the account number into the system so that the subsequent instruction block does not encounter an error condition due to a missing account number.

Communication interface module 215 may then be invoked to generate a communication channel interface between the client device and the contact run-time engine 200. For example, in implementations where the contact workflow is an IVR workflow, communication interface module 215 may generate a softphone interface between the client device and contact run-time engine 200. As noted above, the softphone interface facilitates simulated telephonic communication between the client device and the IVR run-time engine 200. Similarly, in implementations where the contact workflow is a chat/chatbot workflow, communication interface module 215 can generate a chat communication channel interface between the client device and the contact run-time engine. In implementations where the contact workflow is an SMS/text workflow, communication interface module 215 may generate a communication interface channel that supports SMS/text communication.

Contact display module 225 may then be invoked to send a notification to the client device to cause the client device to display a GUI element within the GUI of the client device that can receive input for the communication channel interface as well as provide output generated by the contact workflow to the communication channel interface. For example, in implementations where the contact workflow is an IVR workflow, the GUI element may be a keypad GUI element that is presented like the keypad of a touchtone telephone so that a user interacting with the IVR workflow may enter numeric or alphanumeric responses to IVR prompts as if using a conventional telephone. Similarly, in implementations where the contact workflow is a chat or SMS/text message workflow, the GUI element may be an input window that displays chat and/or SMS/text message interactions.

Contact workflow execution module 220 may then be invoked to begin execution of the contact workflow from the selected starting instruction block. Contact workflow execution module 220 may invoke contact workflow display module 225 to provide a visual indicator for display (e.g., by sending GUI visual indicators 265 to the client device) within the GUI that graphically highlights the starting instruction block to indicate that the starting instruction block is active. As noted above, the active instruction block may be highlighted in a bold color so that it may be visually distinguished from other non-active instruction blocks in the contact workflow.

Contact workflow execution module 220 may then invoke communication interface module 215 to initiate communication with the client device. For example, for an IVR workflow where the instruction block includes an audio prompt, communication interface module 215 can send the audio prompt for the instruction block (e.g., communication interface output 263) to the softphone interface to cause the softphone interface to provide the audio prompt to an audio output interface of the client device (e.g., playing the audio prompt via the audio speaker of the client device). Similarly, for a chat or SMS/text workflow, contact workflow execution module 220 may send communications to the client device (e.g., chat prompts, SMS/text messages, etc.).

Communication interface module 215 may subsequently receive a response to the audio prompt (e.g., communication interface input 262) via the softphone interface. Similarly, communications module 215 may receive a response to any chat prompts or SMS/text messages sent by a chat or SMS/text workflow. In IVR workflow implementations, the response may be received from the keypad GUI element for the softphone interface. Alternatively, the response may be received from the audio microphone of the client device. Contact workflow execution module 220 may then use the response to the audio prompt to identify a command to execute a second instruction block in the IVR workflow. Contact workflow execution module 220 may invoke contact workflow display module 225 to provide a visual indicator for display within the GUI that graphically connects the prompt instruction block and the second instruction block. For example, contact workflow display module 225 may send a notification to the GUI of the client device to highlight the connector line between the two instruction blocks within the display using a particular color, a particular format (e.g., as a dashed line rather than solid), or the like.

As the second instruction block begins execution (e.g., becomes the active block) contact workflow execution module 220 may invoke contact workflow display module 225 to send a notification to the GUI of the client device to remove the visual indicator from the initial starting instruction bock (e.g., by removing the highlighting), and subsequently display a visual indicator that graphically highlights the second instruction block (e.g., the newly active instruction block) to indicate that it is active. Contact workflow execution module 220 may then execute the second instruction block. In some implementations the second instruction block may include another audio prompt. Alternatively, the second instruction block may include a command to be executed without a prompt (e.g., adding the caller to a call queue for technical support).

In another embodiment, contact run-time engine 200 may facilitate replaying a previously stored interaction with a contact workflow (e.g., a previously captured call that was processed by an IVR workflow, a previously captured chat interaction processed by a chat/chatbot workflow, etc.). Request processor 205 can receive a request from a client device to load a client workflow from a stored library of contact workflows. As noted above, in IVR implementations, an IVR workflow can include multiple instruction blocks, where an instruction block may include an audio prompt and a command to execute a second instruction block based the value of a response to the audio prompt. In some implementations, each audio prompt in an IVR workflow may be associated with an instruction block version identifier to distinguish different versions of an instruction block across different IVR workflows. For example, an initial version of and instruction bock may include a prompt that describes two valid responses (e.g., "press 1 for support, press 2 for sales), whereas a subsequent version of the instruction block may include a prompt that describes three valid responses (e.g., "press 0 for an operator, press 1 for support, press 2 for sales"). Each prompt may have a unique instruction block version identifier so that the two instruction blocks may be distinguished from each other (e.g., "v1.0" and "v1.1", or the like).

As in the testing embodiment described above, request processor 205 may receive the request from the graphical user interface (GUI) presented to the client device by contact run-time engine 200. Request processor 205 may then invoke contact workflow loader 210 to load workflow 260 from the workflow library into the interactive contact run-time environment. Also as noted above, contact workflow display module 225 may be invoked to provide a graphical representation of the IVR workflow for display by the GUI of the interactive contact run-time environment where each instruction block in the contact workflow may be presented as visual objects within the GUI.

Request processor 205 may subsequently receive a request from the client device to load data for a previously recorded interaction with the contact workflow. Request processor 205 may then invoke contact workflow response data module 230 to retrieve recorded interaction 261 from a data store of recorded interactions (e.g., recorded interactions 154 of FIG. 1). As noted above, recorded interaction 261 may include a version number/identifier for the overall contact workflow, a recorded instruction block version identifier for each of the instruction blocks that were executed during that interaction, the response provided by the caller to each prompt (e.g., the value entered by the caller in response to the prompt), a listing of the order of the prompts encountered by a caller (e.g., the workflow path of a caller), or any similar information associated with that particular interaction.

Request processor 205 may then receive a request from the client device to execute an instruction block of the contact workflow. As described above in the testing embodiment, the contact workflow may be initiated from the "entry point" of the workflow or from a selected instruction block within the workflow. Contact workflow execution module 220 may be invoked to execute the appropriate instruction block as described above. Once a starting instruction block has been identified, contact workflow execution module 220 may use the response data loaded from recorded interaction 261 to "replay" that interaction within the contact workflow displayed in the GUI of the run-time environment.

In some implementations, the version of the instruction blocks in the loaded contact workflow may be compatible with the version of the instruction blocks from the interaction being replayed. In such cases, contact workflow execution module 220 may invoke contact workflow response data module 230 to access the loaded response data from recorded interaction 261 to provide input for the compatible instruction block in the workflow. For example, in IVR implementations where an instruction block includes a prompt, contact workflow response data module 230 may access recorded interaction 261 to provide responses to the prompts for each of the instruction blocks in the workflow. Similarly, in implementations where the instruction block uses information other than a response to a prompt (e.g., a data element received by a previously executed instruction block an environmental setting, or the like), that information may be retrieved from recorded interaction 261 to provide the appropriate input to the instruction block.

In IVR workflow implementations, once the audio prompt for the instruction block has been provided to the audio output interface of the client device (via the softphone interface), contact workflow execution module 220 may determine that the instruction block version identifier for the associated instruction block in the IVR workflow is compatible with the recorded instruction block version identifier associated with the recorded response in the recorded interaction. For example, the loaded IVR workflow instruction block may include a prompt that accepts three possible response values (e.g., "press 0 for an operator, press 1 for support, press 2 for sales"), whereas the version of the instruction block in the recorded response may include a prompt that only accepts two possible response values (e.g., "press 1 for support, press 2 for sales"). Since both of the acceptable values for the prompt in the recorded response are also acceptable for the loaded IVR workflow, the two instruction blocks may be considered compatible with each other.

Accordingly, contact workflow execution module 220 may provide the recorded response from the loaded response data to the instruction block as a response to the audio prompt for that block. Contact workflow execution module 220 may then use the response to the audio prompt to identify a command to execute a second instruction block in the IVR workflow, and execute that command to invoke the second instruction block.

In some implementations, the version of the instruction blocks in the loaded contact workflow may not be compatible with the version of the instruction blocks from the interaction being replayed. In such cases, contact workflow execution module 220 may prompt a user to provide response data that is compatible with the loaded contact workflow. For example, a loaded IVR workflow instruction block may include a prompt that accepts two possible response values (e.g., "press 1 for support, press 2 for sales"), whereas the version of the instruction block in the recorded response may include a prompt that accepts three possible response values (e.g., "press 0 for an operator, press 1 for support, press 2 for sales"). Since the recorded response may include a value not supported by the loaded IVR workflow, the two instruction blocks may be considered incompatible with each other.

As noted above, when replaying execution of an instruction block in the workflow, contact workflow execution module 220 may invoke contact workflow response data module 230 to retrieve the response data from recorded interaction 261 to provide a response to the prompt for that instruction block. Contact workflow execution module 220 may determine that the instruction block version identifier of the contact workflow is incompatible with the recorded instruction block version identifier in the response data. Contact workflow execution module 220 may then send a notification to the client device to provide a value for the response that is compatible with the instruction block. For example, contact workflow execution module may invoke contact workflow display module 225 to cause the GUI to display a dialog window to inform the user than an incompatible response has been encountered so that the user may override that response within the workflow. Contact workflow execution module may receive the response from the client device and provide that response to the executing instruction block as a response to the prompt.

In another embodiment, contact run-time engine 200 may facilitate statistical analysis of contact traffic flow based on previously captured contact workflow interactions. Contact run-time engine 200 may calculate statistical information associated with a contact workflow and provide that information for display in GUI 135 with the associated contact workflow. Request processor 205 can receive a request from a client device to load a contact workflow from a stored library of workflows. As noted above, the contact workflow may include multiple instruction blocks. In some implementations, an instruction block may include a prompt and one or more commands to execute additional instruction blocks based on received values for responses to the prompt. Alternatively, an instruction block may include a command to execute an additional instruction block based on environmental parameters or other collected data rather than in response to a prompt.

As in the testing embodiment described above, request processor 205 may receive the request from the graphical user interface (GUI) presented to the client device by contact run-time engine 200. Request processor 205 may then invoke contact workflow loader 210 to load workflow 260 from the workflow library into the interactive contact run-time environment. Also as noted above, contact workflow display module 225 may be invoked to provide a graphical representation of the IVR workflow for display in the GUI of the interactive contact run-time environment where each instruction block in the contact workflow may be presented as visual objects within the GUI.

Request processor 205 may then receive a request to conduct statistical analysis of the loaded contact workflow to display observed traffic for each instruction block of the workflow. Request processor 205 may receive a time period during which interactions with the loaded contact workflow were previously recorded. The time period may be entered by a user into a text input GUI element of the GUI. Alternatively, contact run-time engine 200 may present a list of available time periods for a user to select.

Contact workflow statistics module 240 may then be invoked to identify any previously recorded interactions with the contact workflow that occurred during the received time period. Contact workflow statistics module 240 may then calculate statistical information for the identified interactions. In IVR workflow implementations, the statistical information can indicate a distribution of values for a captured response to a prompt across the identified recorded interactions. As noted above, for a prompt that has three possible acceptable response values (e.g., "press 0 for an operator, press 1 for support, press 2 for sales"), IVR workflow statistics module 240 may determine the percentage of callers that selected the first response value (e.g., "0"), the percentage of callers that selected the second response value (e.g., "1"), and the percentage of callers that selected the third response value (e.g., "2").

In some implementations, the statistical information can indicate a distribution of values for other types of collected data across the identified recorded interactions. For example, in some IVR workflows, one instruction block may invoke a second instruction block based on an environmental parameter or other data received for a previously executed instruction block. Similarly, an instruction block may invoke different subsequent instruction blocks based on the date, time, contact location (e.g., location of original caller), or similar other information stored in the collected data. For example, one instruction block of a workflow may include a command to execute a second instruction block if an account number is within a particular range, and a second command to execute a third instruction block if the account number is outside that range. Contact workflow statistics module 240 may determine the percentage of recorded interactions where the first command was executed and the percentage of recorded interactions where the second command was executed.

In some implementations, contact workflow statistics module 240 may select the recorded interactions for statistical analysis by comparing the version identifier of the loaded contact workflow to the version identifier of the workflow associated with the recorded interactions that occurred during the received time period. If the version identifiers are compatible, the recorded interaction may be selected for statistical analysis. In some implementations, the version identifiers may be determined to be compatible if the identifiers match. Alternatively, the version identifiers may be determined to be compatible if the identifiers are both on a stored list of compatible contact workflow versions.

Once the statistical information has been calculated, contact workflow display module 225 may be invoked to provide visual indicators for display within the GUI that graphically highlight the distribution of values for the captured response data. Using the above prompt example, contact workflow display module 225 may provide a visual indicator for display of the first response value (e.g., "0") in proximity to the corresponding graphical representation of the command in that instruction block. Similarly, contact workflow display module 225 may provide the percentage of callers that selected the second response value (e.g., "1") for display in proximity to the corresponding graphical representation of that command in that instruction block. In some implementations, the visual indicators for each response value may be provided for display using different colors, different intensities (e.g., varying brightness of the color), different formats (e.g., solid lines, dashed lines, etc.), or the like. Additionally, contact workflow display module 225 may provide visual indicators for display that graphically connect the commands to the corresponding execution blocks that may be subsequently executed. In some implementations, these visual indicators may be provided for display using the same color, intensity, and/or format as the visual indicators for the percentage values.

In some implementations, the displayed statistical information may be updated in real-time as new interactions are captured and stored based on new calls being received for the contact workflow. Contact run-time engine 200 may receive a new interaction that includes a new captured response data for the various prompts within the workflow. Contact run-time engine 200 may then store the newly captured response in the data store of recorded interactions. Contact workflow statistics module 240 may then be invoked to calculate updated statistical information for the previously recorded interactions to include the newly captured response data. Subsequently, contact workflow display module 225 may then be invoked to update the visual indicators for display within the GUI that graphically highlight the distribution of values for the captured responses to include the new captured response.

FIGS. 3A-5 illustrate examples of a graphical user interface (GUI) for presenting contact workflow interactions in accordance with various aspects of the present disclosure. FIGS. 3A-3D illustrate an example of a graphical user interface (GUI) 300 for testing an IVR workflow in a single window with a softphone interface generated in real time. GUI 300 may be presented by a stand-alone application, a component of a user interface for a web browser, or in any other manner. For example, GUI 300 may correspond to GUI 135 that is presented to a user by contact run-time engine 115 of FIG. 1.

Figure 3A:
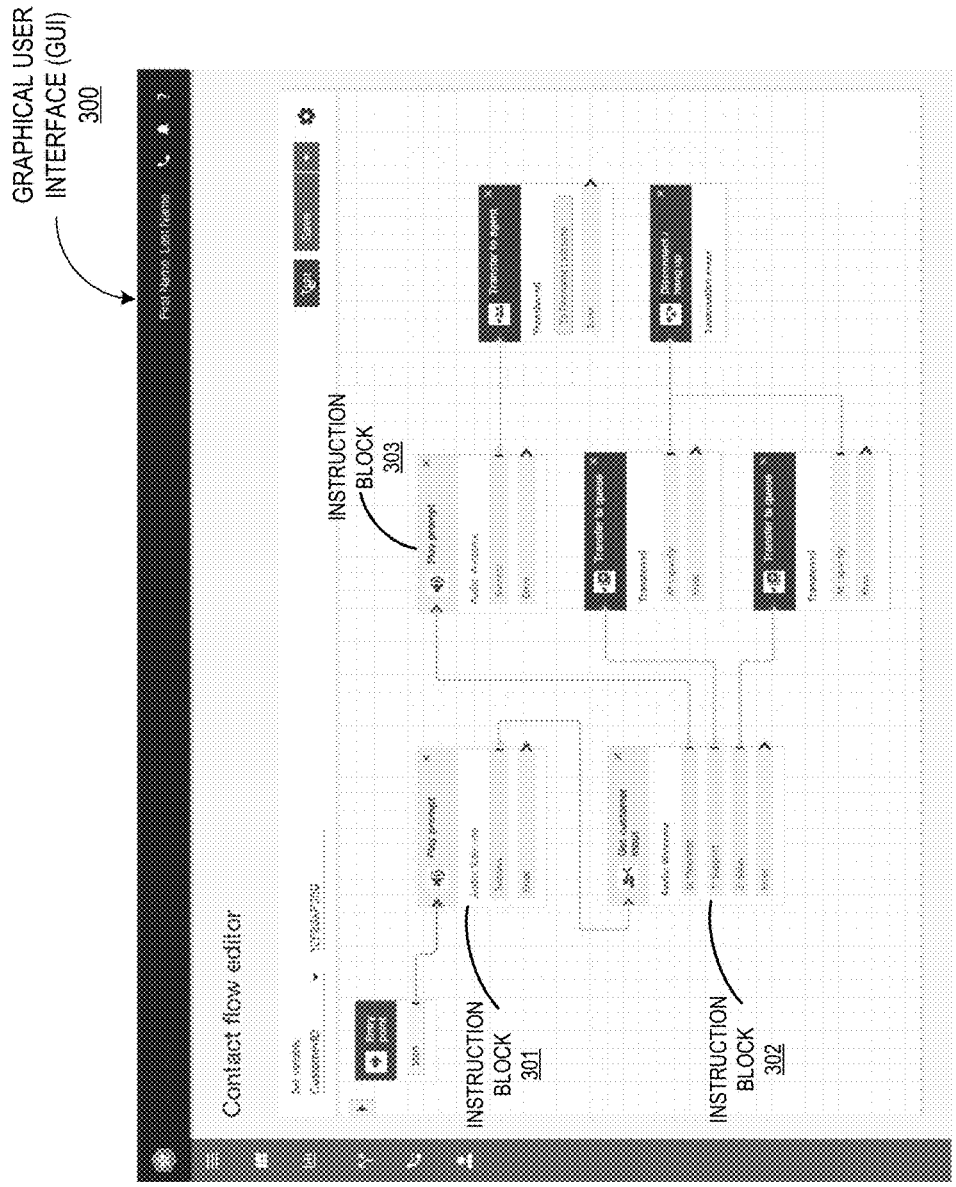
FIG. 3A illustrates an example of a graphical user interface (GUI) for testing a contact workflow in a single window with a softphone interface, in accordance with one embodiment.

As shown in FIG. 3A, GUI 300 displays a loaded IVR workflow that includes instruction blocks 301, 302, and 303. Each of instruction blocks 301-303 are graphically represented by a box in the GUI 300, and each include a prompt as well as valid responses to the prompt and commands to execute a subsequent instruction block based on the value of a response. For example, instruction block 301 includes the prompt "welcome" with no required responses and a single command that executes instruction block 302. A connector line connects instruction block 301 to block 302 to indicate that this is the only path to be taken.

Instruction block 302 includes the audio prompt "welcome" with three valid responses: "0" for operator, that includes a command to execute block 303; "1" for support, that includes a command to execute another instruction block; and "2" for sales, that includes a command to execute a different instruction block. A connector line is displayed in GUI 300 for each valid response to indicate the corresponding instruction block that may be executed.

Figure 3B:
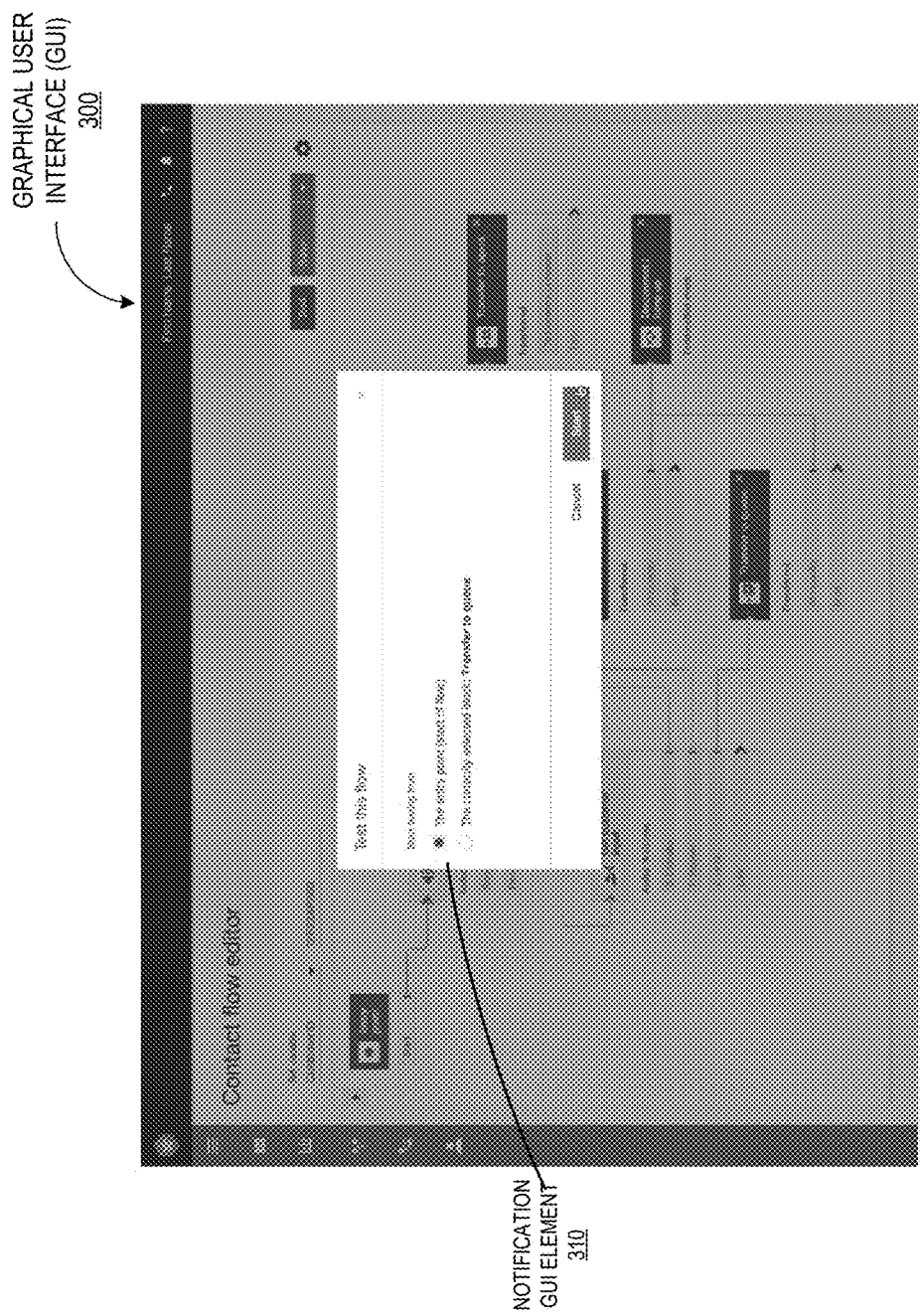
FIG. 3B illustrates an example of a notification element displayed by a GUI to prompt a user to specify a starting instruction block to execute for a contact workflow, in accordance with one embodiment.

FIG. 3B illustrates a notification element 310 displayed by GUI 300 to prompt the user to specify a starting instruction block to execute for the IVR workflow. As shown in FIG. 3B, the notification element 310 provides a user with the option of starting the test from the entry point of the IVR workflow (e.g., the beginning of the loaded workflow), or at the currently selected block within the GUI (e.g., the "Transfer to queue" block of the loaded workflow).

Figure 3C:
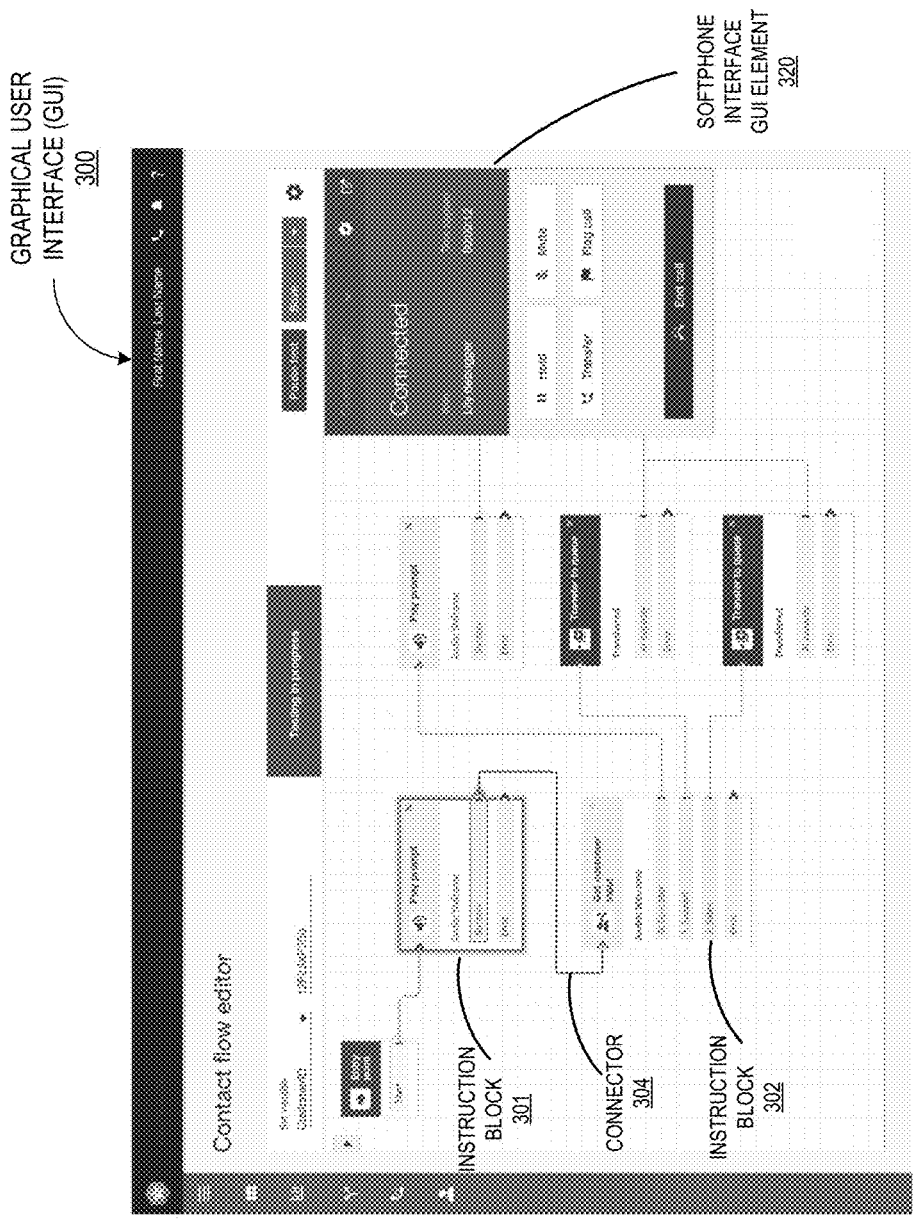
FIG. 3C illustrates an example of a illustrates a softphone interface element displayed by GUI during execution of the contact workflow, in accordance with one embodiment.

FIG. 3C illustrates a softphone interface element 320 displayed by GUI 300 during execution of the IVR workflow. As shown in FIG. 3C, execution of the workflow has been initiated from the entry point, invoking instruction block 301. A softphone interface is generated as described above with respect to FIGS. 1-2, and GUI 300 displays softphone interface GUI element 320 to facilitate telephonic interaction with a user that is testing the workflow. Additionally, GUI 300 includes a visual indicator that indicates instruction block 301 is active (e.g., the box for instruction block 301 is highlighted), and the connector line between instruction block 301 and instruction block 302 (connector 304) is highlighted to indicate that this is the only execution path subsequent to the execution of instruction block 301.

Figure 3D:
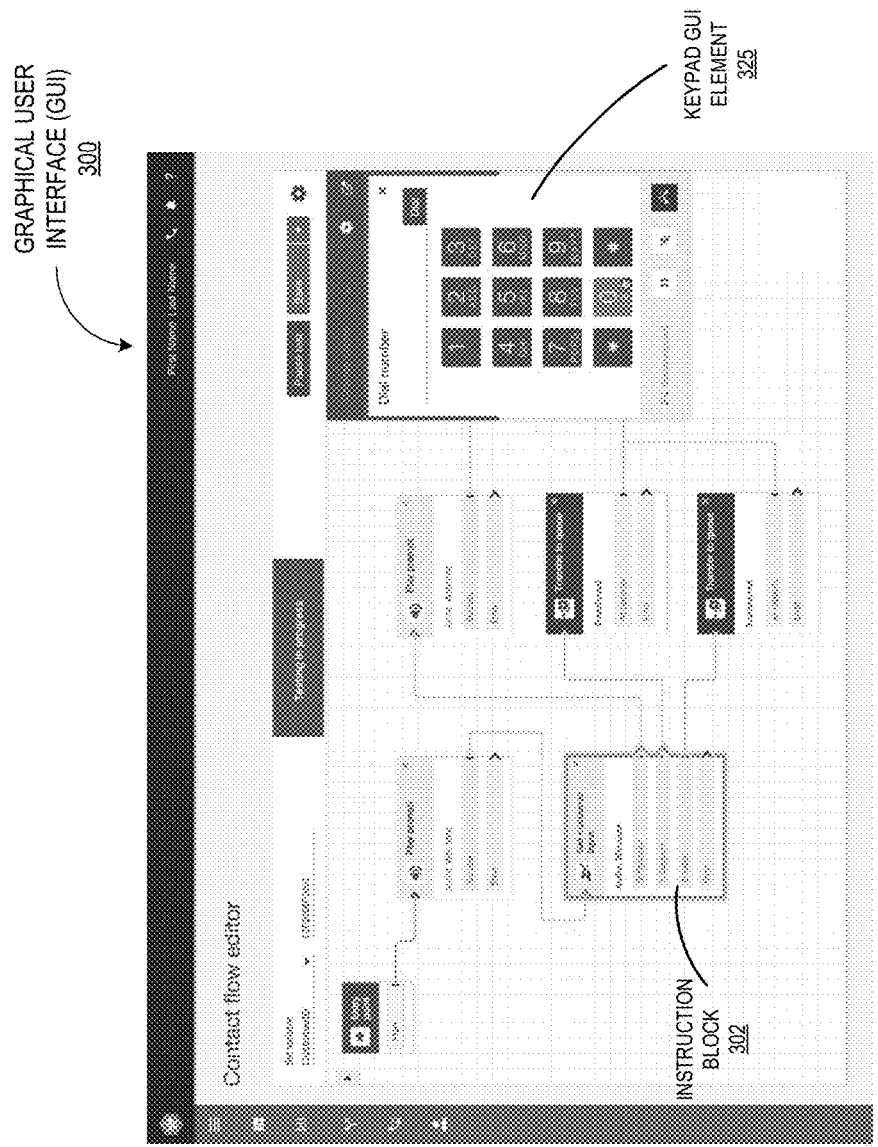
FIG. 3D illustrates an example of a keypad GUI element displayed by a GUI for a softphone interface, in accordance with one embodiment.

FIG. 3D illustrates a keypad GUI element 325 displayed by GUI 300 for the softphone interface. As shown in FIG. 3D, keypad GUI element 325 displays a simulated touchtone keypad to provide a user with the ability to enter a response to the prompt for instruction block 302.

Figure 3E:
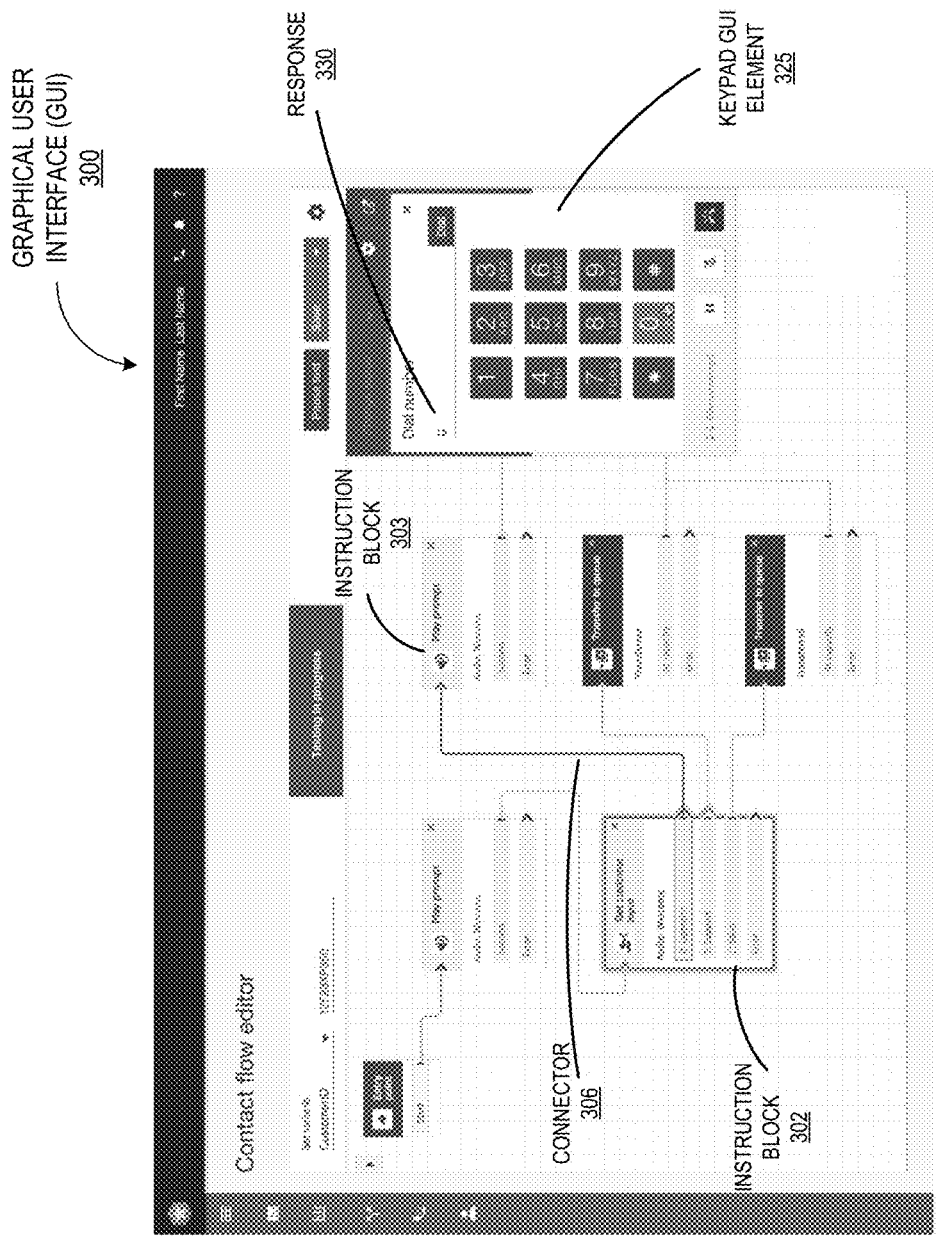
FIG. 3E illustrates an example of a response using a keypad GUI element for testing a loaded contact workflow, in accordance with one embodiment.

FIG. 3E illustrates a response 330 using keypad GUI element 325 for testing a loaded IVR workflow. As shown in FIG. 3E, a user has entered a "0" as response 330 using the "0" key of keypad GUI element 325. Response 330 is sent to instruction block 302, causing instruction block 302 to execute the "operator" command that is associated with a response of "0". GUI 300 then highlight the connector 306 to indicate that the response of "0" will initiate instruction block 303.

Figure 4A:
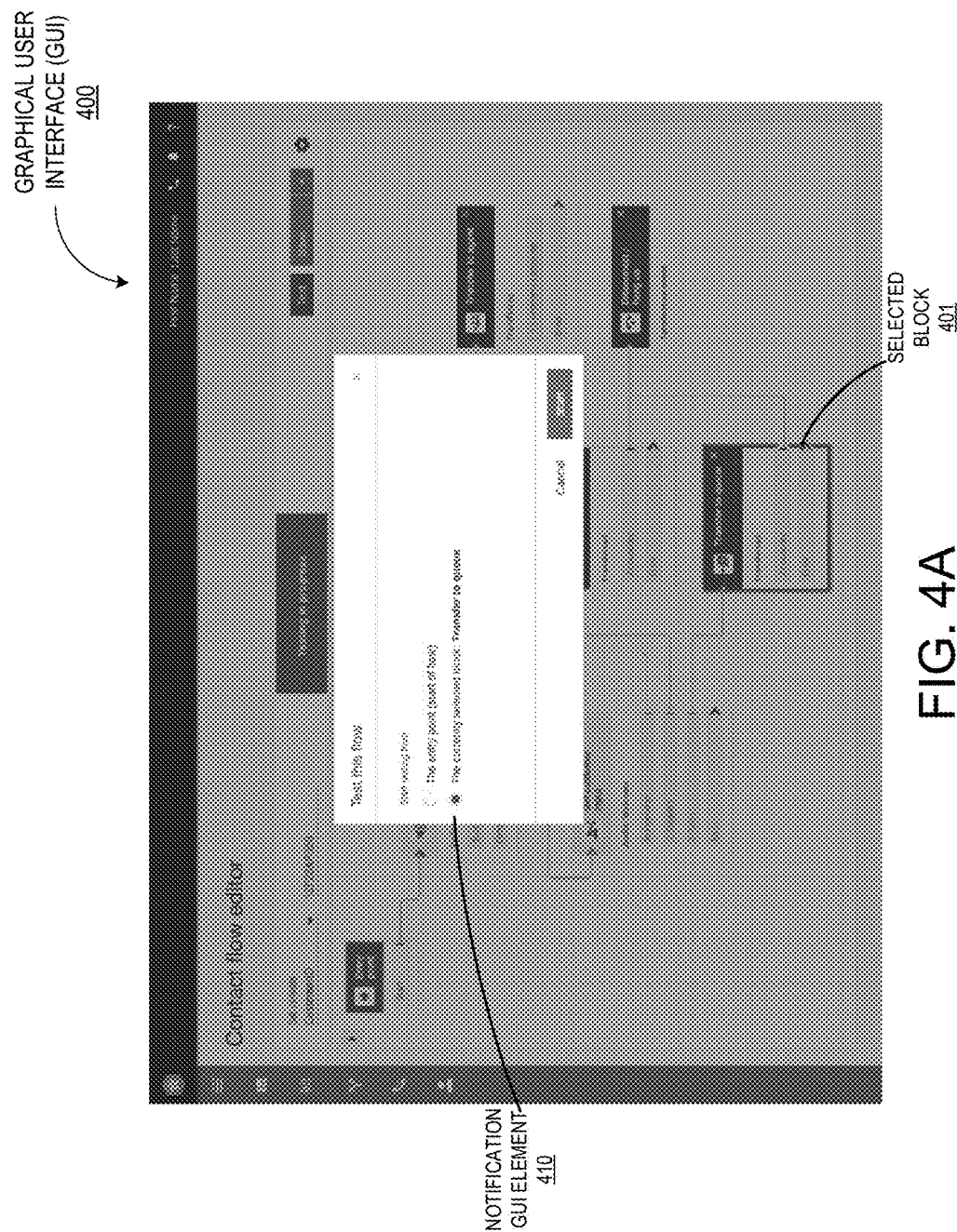
FIG. 4A illustrates an example of a notification element displayed by a GUI to prompt the user to specify a starting instruction block to execute for the contact workflow, in accordance with one embodiment.
Figure 4B:
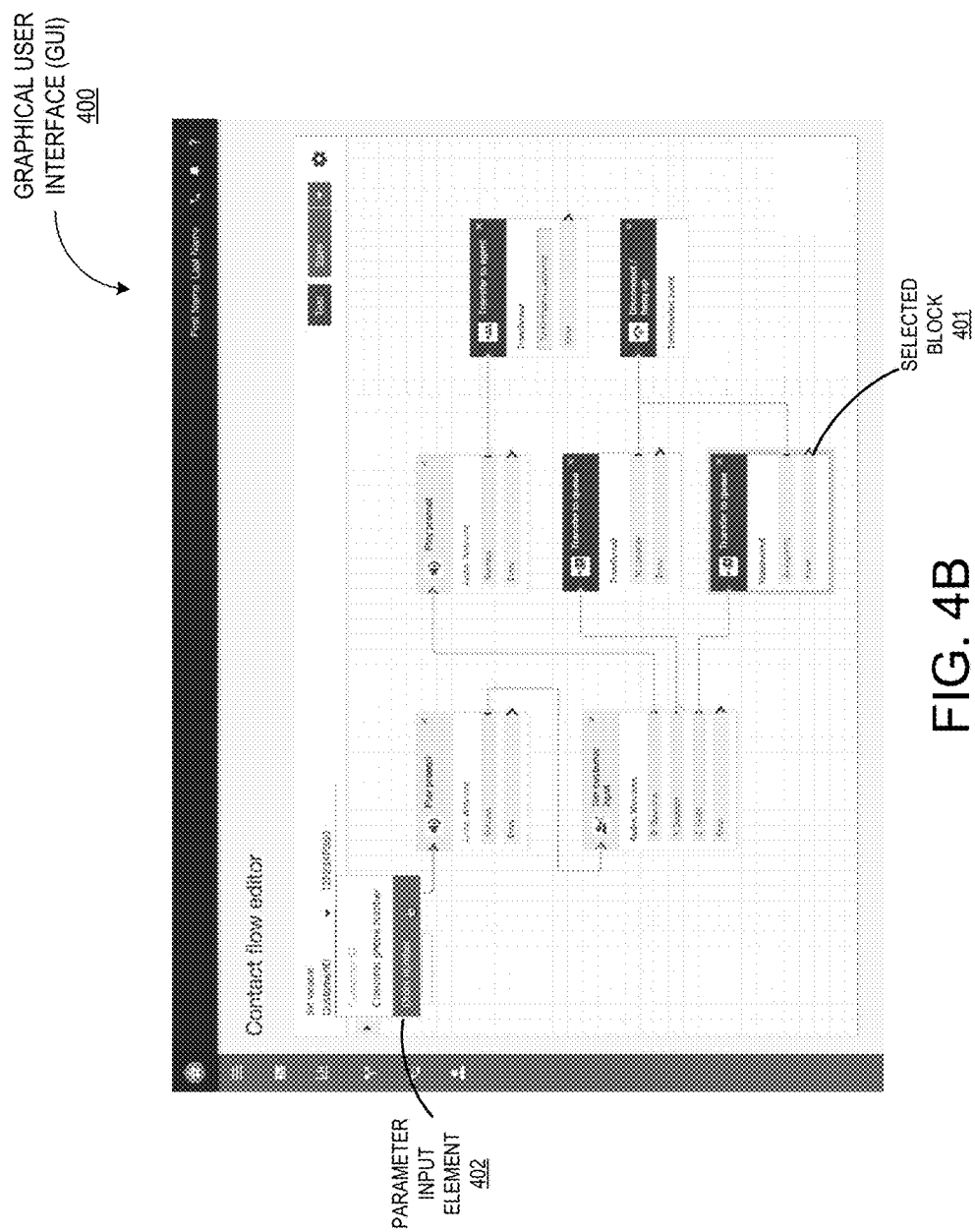
FIG. 4B illustrates an example of a parameter input element displayed by a GUI to allow a user to enter environmental parameters for testing an contact workflow, in accordance with one embodiment.

FIGS. 4A-4B illustrate another example of a graphical user interface (GUI) 400 for testing contact workflow from a selected instruction block. GUI 400 may be presented by a stand-alone application, a component of a user interface for a web browser, or in any other manner. For example, GUI 400 may correspond to GUI 135 that is presented to a user by contact run-time engine 115 of FIG. 1.

FIG. 4A illustrates a notification element 410 displayed by GUI 400 to prompt the user to specify a starting instruction block to execute for the contact workflow. As shown in FIG. 4A, the notification element 410 provides a user with the option of starting the test from the entry point of the contact workflow (e.g., the beginning of the loaded workflow), or at the currently selected block 401 within the GUI (e.g., the "Transfer to queue" block of the loaded workflow). As shown in FIG. 4A, the user has selected the option to begin the test at the currently selected block 401.

FIG. 4B illustrates a parameter input element 402 displayed by GUI 400 to allow a user to enter environmental parameters for testing contact workflow. As shown in FIG. 4B, the contact workflow has been initiated to begin at selected block 401. Since selected block 401 occurs within the contact workflow, it expects some environmental parameters to have been received by the previous instruction blocks in the workflow. A user may enter any environmental parameters for selected block 401 into parameter input element 402.

Figure 5:
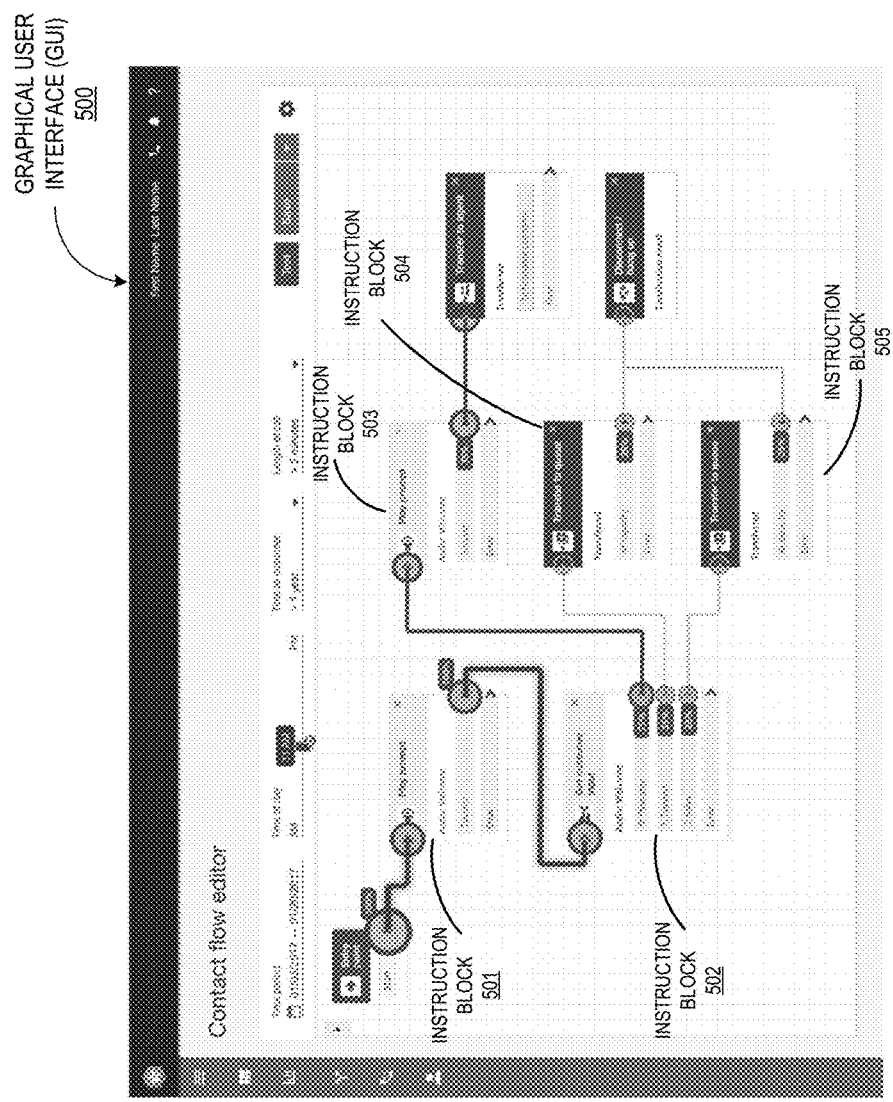
FIG. 5 illustrates an example of a GUI that displays statistical information for previously captured interactions with a contact workflow, in accordance with one embodiment.

FIG. 5 illustrates a GUI 500 that displays statistical information for previously captured interactions with an contact workflow. As shown in FIG. 5, GUI 500 displays the workflow traffic over a time period of 17 days (Jan. 3, 2017-Jan. 20, 2017). Each instruction block in GUI 500 depicts a visual indicator that displays the percentages for the available responses for that instruction block. As shown in FIG. 5, instruction block 501 executed instruction block 502 100% of the time during that time period. Additionally, at instruction block 502, 75% of the responses selected option "0", 25% of the responses selected option "1", and 25% of the responses selected option "2". GUI 500 also displays varying intensities for the visual indicators for each percentage value. Thus, the percentage value for option "0" (e.g., 75%) is displayed in a bolder intensity than that for the other two response values which are for 25%. Moreover, the connector line between instruction block 502 and instruction block 503 (the instruction block that is executed for a received response of "0") is also displayed with increased intensity.

Also as shown in FIG. 5, instruction blocks 504 and 505 depict examples of instruction blocks without included prompts. Instruction block 504 includes a command that is executed when an "at capacity" condition is encountered. A visual indicator is displayed for the "at capacity" command to indicate 25% of the previously captured interactions encountered the "at capacity" condition at instruction block 504 after having selected the "support" option at instruction block 502. Similarly, instruction block 505 includes an "at capacity" command that was encountered by 25% of the previously captured interactions that had selected the "sales" option at instruction block 502.

Figure 6:
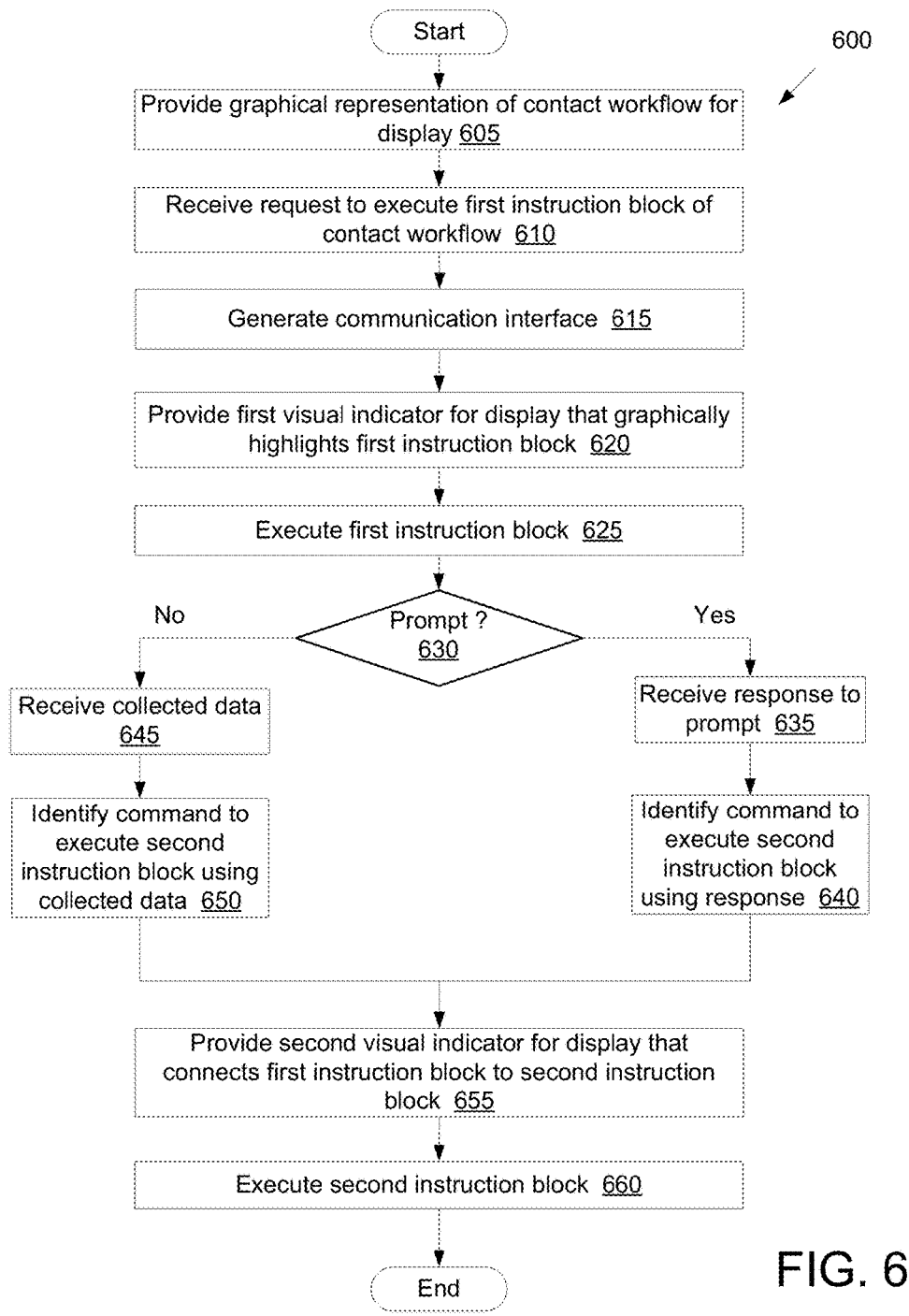
FIG. 6 is a flow diagram of an embodiment for a method of testing a contact workflow in a single window with a softphone interface generated in real time.
Figure 7:
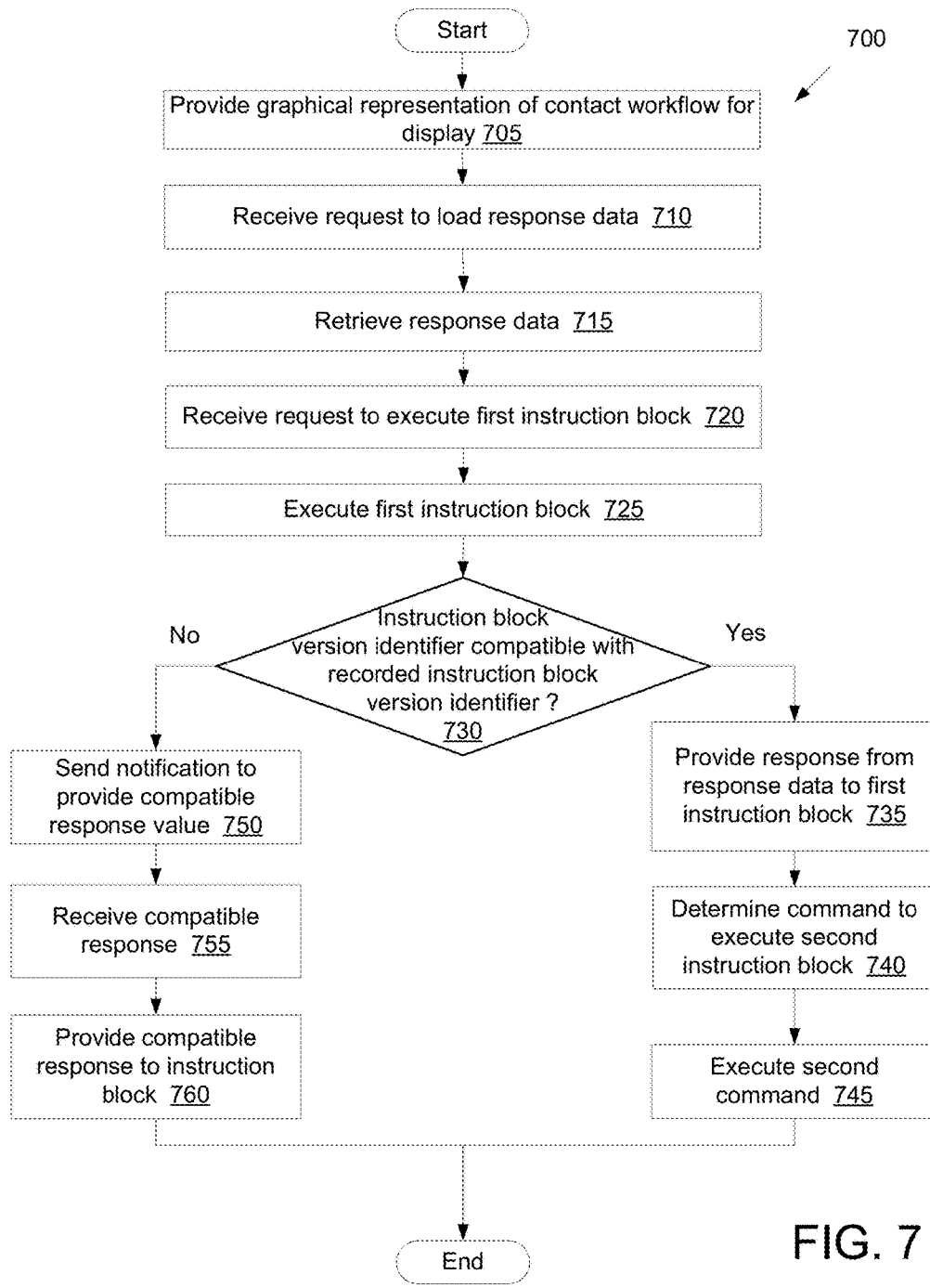
FIG. 7 is a flow diagram of an embodiment for a method of replaying a previously stored interaction with a contact workflow.
Figure 8:
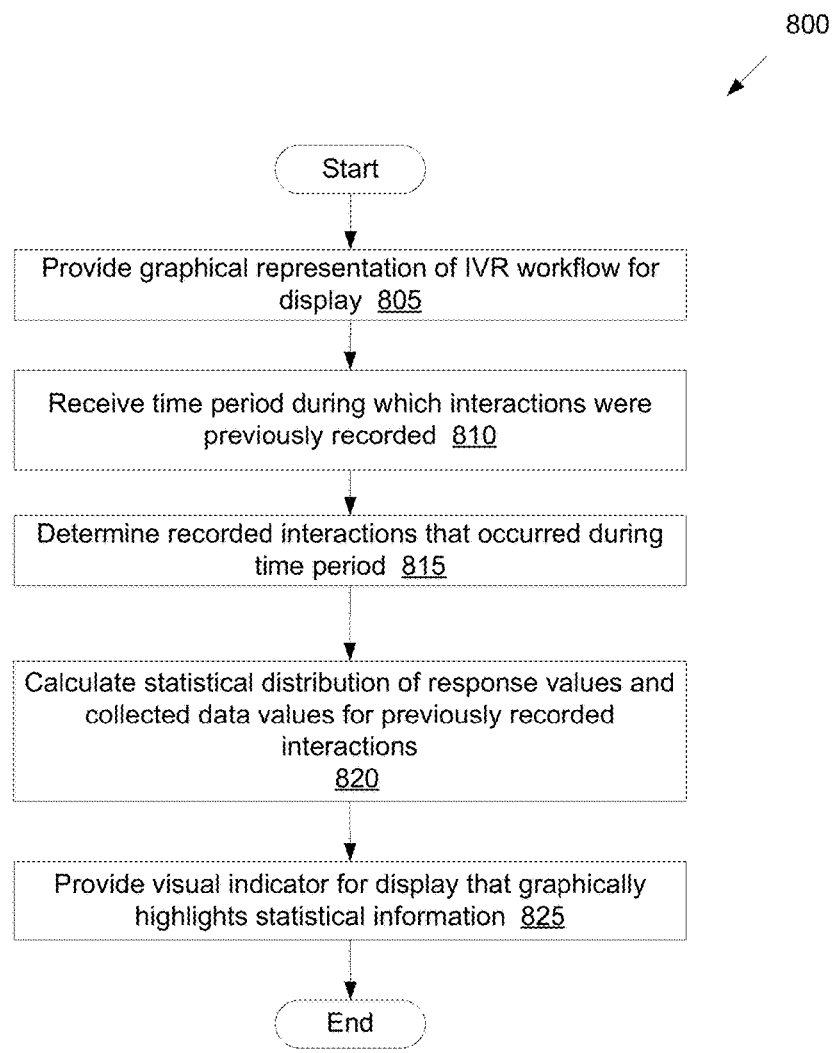
FIG. 8 is a flow diagram of an embodiment for a method of displaying statistical information for previously captured interactions with a contact workflow.

FIGS. 6-8 are flow diagrams of various embodiments of methods performed by a device to manage a free space buffer threshold. The methods are performed by processing logic that may include hardware (circuitry, dedicated logic, etc.), software (such as is run on a general purpose computer system or a dedicated machine), firmware, or some combination thereof. In one implementation, the methods may be performed by contact run-time engine 110 of FIG. 1, and/or contact run-time engine 200 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 6 is a flow diagram of an embodiment for a method 600 of testing a contact workflow in a single window with a communication interface generated in real time. At block 605 of method 600, processing logic provides a graphical representation of a contact workflow for display in a graphical user interface (GUI) of an interactive contact run-time environment. In some implementations, the contact workflow may be loaded from a stored library of workflows into an interactive contact run-time environment. In some implementations, the contact workflow may be an Interactive Voice Response (IVR) workflow that includes a plurality of instruction blocks, where a first instruction block of the plurality of instruction blocks includes a first audio prompt and a first command to execute a second instruction block based at least in part on receiving a response to the first audio prompt. In some implementations, the first instruction block and the second instruction block are provided for display as visual objects within the GUI.

At block 610, processing logic receives a request to execute the first instruction block of the IVR workflow within the interactive IVR run-time environment. At block 615, processing logic generates a communication interface to facilitate simulated electronic communication between the GUI and the interactive contact run-time environment. In IVR workflow implementations, the communication interface may be a softphone interface to facilitate simulated telephonic communication between the GUI and the interactive contact run-time environment. Alternatively, in chat/chatbot workflows, the communication interface may be chat interface to facilitate simulated online chat communication between the GUI and the interactive contact run-time environment. In SMS/text message workflows, the communication interface may be an SMS/text interface to facilitate simulated SMS/text message communication between the GUI and the interactive contact run-time environment.

In some implementations, processing logic sends a notification to the client device to cause the client device to display a GUI element associated with the generated communication interface. For example, in implementations where a softphone interface is generated, processing logic sends a notification to cause the client device to display a keypad GUI element within the GUI that receives simulated telephonic keypad input for the softphone interface. Similarly, in implementations where a chat or SMS/text interface is generated, processing logic sends a notification to cause the client device to display a text entry element within the GUI that provides chat and/or SMS/text messaging capability.

At block 620, processing logic provides a first visual indicator for display within the GUI that graphically highlights the first instruction block to indicate that the first instruction block is active. At block 625, processing logic executes the first instruction block. In implementations where the first instruction block includes the audio prompt, processing logic sends the audio prompt of the first instruction block to the softphone interface to cause the softphone interface to provide the first audio prompt to an audio output interface.

At block 630, processing logic branches based on whether the first instruction block sent a prompt at block 625. If so, processing logic continues to block 635. Otherwise processing logic proceeds to block 645. At block 635, processing logic receives a response to the first prompt via the keypad GUI element for the softphone interface. At block 640, processing logic identifies a command using the response received at block 635, where the command executes the second instruction block in the contact workflow. Processing then continues to block 655.

If the first instruction block does not include a prompt, processing proceeds to block 645. At block 645, processing logic receives data collected by the contact workflow at first instruction block. For example, the first instruction block may include a command that uses an environmental parameter, or a data element that was captured by a previously executed instruction block. At block 650, processing logic identifies a command to execute a second instruction block using the collected data. For example, processing logic may identify the command to execute a particular instruction block based on an account number or account number range that had been collected at an earlier point in the contact flow.

At block 655, processing logic provides a second visual indicator for display within the GUI that graphically connects the first instruction block to the second instruction block. At block 660, processing logic executes the second instruction block by executing at least one of an audio prompt of the second instruction block or a command of the second instruction block. In some implementations, processing logic provides a third visual indicator for display in the GUI that graphically highlights the second instruction block to indicate that the second instruction block is active. After block 665, the method of FIG. 6 terminates.

FIG. 7 is a flow diagram of an embodiment for a method 700 of replaying a previously stored interaction with a contact workflow. At block 705 of method 700, processing logic provides a graphical representation of a contact workflow for display in a GUI of an interactive contact run-time environment. In some implementations, the contact workflow may be loaded from a stored library of workflows into an interactive contact run-time environment. In some implementations, the contact workflow may be an Interactive Voice Response (IVR) workflow that includes a plurality of instruction blocks, where a first instruction block of the plurality of instruction blocks includes a first audio prompt and a first command to execute a second instruction block based at least in part on receiving a response to the first audio prompt, and where the first instruction block is associated with a first instruction block version identifier. In some implementations, the first instruction block and the second instruction block are provided for display as visual objects within the GUI.

At block 710, processing logic receives a request to load response data for a previously recorded interaction with the contact workflow. At block 715, processing logic retrieves the response data for the previously recorded interaction from a data store of stored response data. In some implementations, the response data includes a first response to the first prompt, where the first response is associated with a first recorded instruction block version identifier. At block 720, processing logic receives a request to execute the first instruction block. At block 725, processing logic executes the first instruction block by providing the first audio prompt of the first instruction block to an audio output interface.

At block 730, processing branches based on whether the first instruction block version identifier is compatible with the recorded instruction block version identifier associated with the response data. If so, processing continues to block 735. Otherwise, processing proceeds to block 650.

At block 735, processing logic provides the first response from the response data to the first instruction block as a response to the first audio prompt. At block 740, processing logic determines a command using the first response to the first audio prompt, where the first command executes the second instruction block. At block 745, processing logic executes the command to invoke the second instruction block. After block 745, the method of FIG. 7 terminates.

At block 750, processing logic sends a notification to provide a value for the response that is compatible with the prompt. At block 755, processing logic receives a compatible response. At block 760, processing logic provides the compatible response to the instruction block as a response to the audio prompt. After block 760, the method of FIG. 7 terminates.

FIG. 8 is a flow diagram of an embodiment for a method 800 of displaying statistical information for previously captured interactions with a contact workflow. At block 805 of method 800, processing logic provides a graphical representation of a contact workflow for display in a GUI of an interactive contact run-time environment. At block 810, processing logic receives a time period during which interactions with the contact workflow were previously recorded. At block 815, processing logic determines a plurality of previously recorded interactions with the contact workflow that occurred during the time period, where each of the previously recorded interactions includes either a captured response to a prompt of the contact workflow or at least one data value collected during the execution of an instruction block in the contact workflow.

At block 820, processing logic calculates statistical information for the plurality of previously recorded interactions with the contact workflow. In some implementations, the statistical information indicates a distribution of values for the captured response to the prompt across the plurality of previously recorded interactions. In some implementations, the statistical information indicates a distribution of collected data values across the plurality of previously recorded interactions.

At block 825, processing logic provides a visual indicator for display within the GUI that graphically highlights the distribution of the values for the captured response. After block 825, the method of FIG. 8 terminates.

Figure 9:
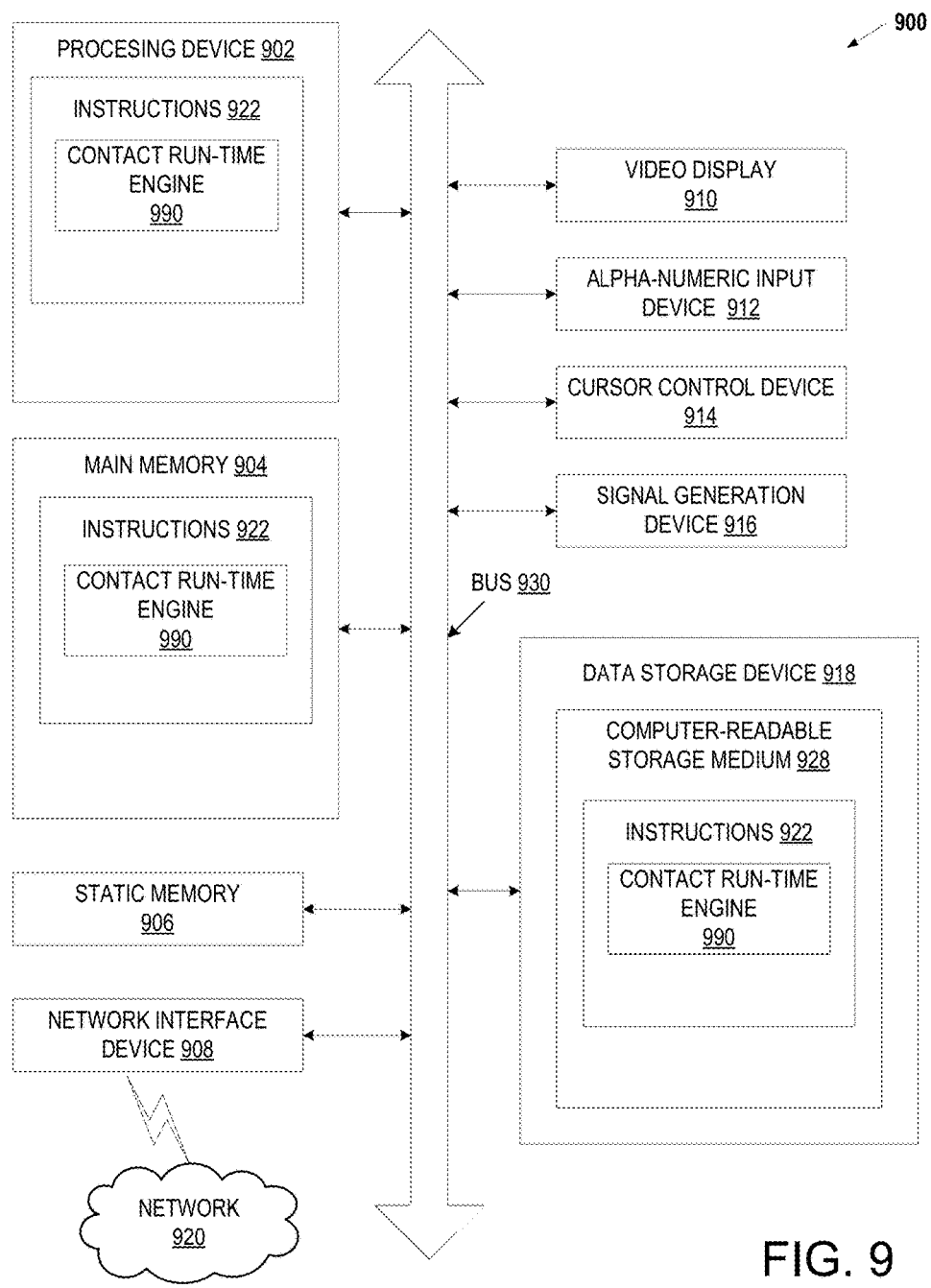
FIG. 9 is a block diagram illustrating a server computing device with a contact run-time engine, in accordance with one embodiment.

FIG. 9 is a block diagram illustrating a server computing device 900 with a contact run-time engine, in accordance with one embodiment. The server computing device 900 may be connected (e.g., networked) to other machines in a LAN, an intranet, an extranet, and/or the Internet. The server computing device 900 may be a personal computer (PC), a tablet PC, a set-top box (STB), a web appliance, a rack-mount server, a network router, a switch or bridge, or any machine capable of executing a set of instructions (sequential or otherwise) that specify actions to be taken by that machine. Further, while a single machine is illustrated, the server computing device 900 shall also be taken to include any collection of machines that individually or jointly execute a set (or multiple sets) of instructions to perform any one or more of the methodologies discussed herein. For example, the server computing device 900 may be one or more devices in a server system. In one embodiment, the server computing device 1000 is one node of a cluster that provides a cloud service such as Amazon's® elastic compute cloud (EC2®), Amazon web services (AWS®), or other cloud service.

The server computing device 900 includes a processing device 902, a main memory 904 (e.g., read-only memory (ROM), flash memory, dynamic random access memory (DRAM) such as synchronous DRAM (SDRAM) or DRAM (RDRAM), etc.), a static memory 906 (e.g., flash memory, static random access memory (SRAM), etc.), and a data storage component 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 922 for performing the operations and steps discussed herein.

The server computing device 900 may further include a network interface device 908. The server computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and/or a signal generation device 916 (e.g., a speaker).

The data storage component 918 may include a machine-readable storage medium 928 (also known as a computer-readable medium) on which is stored one or more sets of instructions or software 922 embodying any one or more of the methodologies or functions described herein. The instructions 922 may also reside, completely or at least partially, within the main memory 904 and/or within the processing device 902 during execution thereof by the server computing device 900, the main memory 1004 and the processing device 902 also constituting machine-readable storage media.

In one implementation, the instructions 922 include instructions for a contact run-time engine 990 (e.g., contact run-time engine 115 of FIG. 1, and/or contact run-time engine 200 of FIG. 2) and/or a software library containing methods that call modules in an contact run-time engine (e.g., corresponding to the methods of FIGS. 6-8, etc.). While the machine-readable storage medium 928 is shown in an example implementation to be a single medium, the term "machine-readable storage medium" should be taken to include a single medium or multiple media (e.g., network attached storage, a centralized or distributed database, and/or associated unsolicited content storage areas and servers) that store the one or more sets of instructions. The term "machine-readable storage medium" shall also be taken to include any medium other than a carrier wave that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "providing", "generating", "executing", "identifying", "removing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention relate to an apparatus for performing the operations herein. This apparatus may be specially constructed for the disclosed purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions (e.g., media other than a carrier wave).

The algorithms and displays presented herein are not inherently related to any particular computer or other apparatus. Various general purpose systems may be used with programs in accordance with the teachings herein, or it may prove convenient to construct a more specialized apparatus to perform the required method steps. The structure for a variety of these systems will appear from the description above. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
displaying a first visual indicator within a graphical user interface (GUI) that graphically highlights a first visual display object within the GUI to indicate that a first instruction block is active within an interactive contact workflow system;
executing the first instruction block by the interactive contact workflow system, wherein executing the first instruction block comprises outputting a first prompt via a communication interface, the communication interface to simulate a telephone communication with the interactive contact workflow system;
receiving a first response to the first prompt from a GUI element of the communication interface;
identifying a first command to execute a second instruction block based at least in part on the first response to the first prompt; and
displaying a second visual indicator within the GUI that graphically connects the first visual display object to a second visual display object within the GUI, the second visual display object corresponding to the second instruction block of the interactive contact workflow system.

2. The method of claim 1, further comprising:
receiving, by the interactive contact workflow system, a request from a client device to load an interactive voice response (IVR) workflow into an interactive contact run-time environment, the IVR workflow comprising a plurality of instruction blocks, including at least the first instruction block and the second instruction block;
providing, by the interactive contact workflow system, a graphical representation of the IVR workflow for display in the GUI, wherein the first instruction block and the second instruction block are displayed as visual objects within the GUI; and
receiving a request from the client device to execute the first instruction block of the IVR workflow within the interactive contact run-time environment.

3. The method of claim 1, wherein the first prompt is a first audio prompt, wherein the first instruction block comprises the first audio prompt and the first command that executes based at least in part on receiving the first response to the first audio prompt.

4. The method of claim 1, further comprising:
generating, by the interactive contact workflow system, the communication interface, wherein the communication interface is a softphone interface between a client device and an IVR run-time environment, wherein the softphone interface is to facilitate simulated telephonic communication between the client device and the IVR run-time environment;
sending a notification to the client device to cause the client device to display a keypad GUI element within the GUI that receives simulated telephonic keypad input for the softphone interface; and
sending the first prompt of the first instruction block to the softphone interface to provide a first audio prompt to an audio output interface of the client device, wherein receiving the first response comprises receiving the first response to the first audio prompt from the client device via the keypad GUI element for the softphone interface, wherein identifying the first command comprises identifying the first command using the first response to the first audio prompt.

5. The method of claim 1, further comprising:
removing the first visual indicator from the first instruction block within the GUI;
providing a third visual indicator that graphically highlights the second instruction block within the GUI to indicate that the second instruction block is active; and
executing at least one of a second audio prompt or a second command of the second instruction block.

6. The method of claim 1, wherein the first instruction block is an entry point at a beginning of an interactive voice response (IVR) workflow, the method further comprising:
sending a notification to a client device to request a starting instruction block to execute in the IVR workflow; and
receiving a confirmation from the client device to set the starting instruction block to the entry point at the beginning of the IVR workflow.

7. The method of claim 1, wherein the first instruction block is within an interactive voice response (IVR) workflow, the method further comprising:
receiving a notification from a client device that the first instruction block is a selected instruction block in the GUI;
sending a notification to the client device to request a starting instruction block to execute in the IVR workflow; and
receiving a confirmation from the client device to set the starting instruction block to the selected instruction block.

8. The method of claim 1, further comprising:
identifying a first environmental parameter for the first instruction block;
sending a notification to a client device to provide a value for the first environmental parameter;
receiving the value for the first environmental parameter; and
storing the value for the first environmental parameter.

9. A method comprising:
providing, by an interactive contact workflow system, a graphical representation of a contact workflow for display in a graphical user interface (GUI) of an interactive contact run-time environment;
receiving a request to execute a first instruction block of the contact workflow within the interactive contact run-time environment;
generating, by the interactive contact workflow system, a softphone interface to facilitate simulated electronic communication between the GUI and the interactive contact run-time environment;
providing a first visual indicator for display within the GUI that graphically highlights the first instruction block within the GUI to indicate that the first instruction block is active; and
executing the first instruction block by sending a first prompt of the first instruction block to the softphone interface to cause the softphone interface to provide the first prompt to an audio output interface;
identifying a first command to execute a second instruction block based at least in part on a first response to the first prompt; and
displaying a second visual indicator within the GUI that graphically connects a first visual display object to a second visual display object within the GUI, the first visual display object corresponding to the first instruction block and the second visual display object corresponding to the second instruction block.

10. The method of claim 9, further comprising:
sending a notification to a client device to cause the client device to display a keypad GUI element within the GUI that receives simulated telephonic keypad input for the softphone interface; and
sending the first prompt of the first instruction block to the softphone interface to provide a first audio prompt to an audio output interface of the client device, wherein receiving the first response comprises receiving the first response to the first audio prompt from the client device via the keypad GUI element for the softphone interface, wherein identifying the first command comprises identifying the first command using the first response to the first audio prompt.

11. The method of claim 9, further comprising:
removing the first visual indicator from the first instruction block within the GUI;
providing a third visual indicator that graphically highlights the second instruction block within the GUI to indicate that the second instruction block is active; and
executing at least one of a second audio prompt or a second command of the second instruction block.

12. The method of claim 9, wherein the first instruction block is an entry point at a beginning of an interactive voice response (IVR) workflow, the method further comprising:
sending a notification to a client device to request a starting instruction block to execute in the IVR workflow; and
receiving a confirmation from the client device to set the starting instruction block to the entry point at the beginning of the IVR workflow.

13. The method of claim 9, wherein the first instruction block is within an interactive voice response (IVR) workflow, the method further comprising:
receiving a notification from a client device that the first instruction block is a selected instruction block in the GUI;
sending a notification to the client device to request a starting instruction block to execute in the IVR workflow; and
receiving a confirmation from the client device to set the starting instruction block to the selected instruction block.

14. The method of claim 9, further comprising:
identifying a first environmental parameter for the first instruction block;
sending a notification to a client device to provide a value for the first environmental parameter;
receiving the value for the first environmental parameter; and
storing the value for the first environmental parameter.

15. A computer system, comprising:
a memory to store instructions; and
at least one processing device, operatively coupled to the memory, to execute the instructions, wherein the computer system is to:
display a first visual indicator within a graphical user interface (GUI) that graphically highlights a first visual display object within the GUI to indicate that a first instruction block is active within an interactive contact workflow system;
execute the first instruction block by the interactive contact workflow system, wherein executing the first instruction block comprises outputting a first prompt via a communication interface, the communication interface to simulate a telephone communication with the interactive contact workflow system;
receive a first response to the first prompt from a GUI element of the communication interface;
identify a first command to execute a second instruction block based at least in part on the first response to the first prompt; and
display a second visual indicator within the GUI that graphically connects a first visual display object to a second visual display object within the GUI, the first visual display object corresponding to the first instruction block and the second visual display object corresponding to the second instruction block.

16. The computer system of claim 15, wherein the computer system is further to:
generate the communication interface, wherein the communication interface is a softphone interface between a client device and an interactive voice response (IVR) run-time environment, wherein the softphone interface is to facilitate simulated telephonic communication between the client device and the IVR run-time environment;
send a notification to the client device to cause the client device to display a keypad GUI element within the GUI that receives simulated telephonic keypad input for the softphone interface; and
send the first prompt of the first instruction block to the softphone interface to provide a first audio prompt to an audio output interface of the client device, wherein receiving the first response comprises receiving the first response to the first audio prompt from the client device via the keypad GUI element for the softphone interface, wherein identifying the first command comprises identifying the first command using the first response to the first audio prompt.

17. The computer system of claim 15, wherein the computer system is further to:
remove the first visual indicator from the first instruction block within the GUI;
provide a third visual indicator that graphically highlights the second instruction block within the GUI to indicate that the second instruction block is active; and
execute at least one of a second audio prompt or a second command of the second instruction block.

18. The computer system of claim 15, wherein the first instruction block is an entry point at a beginning of an interactive voice response (IVR) workflow, wherein the computer system is further to:
send a notification to a client device to request a starting instruction block to execute in the IVR workflow; and
receive a confirmation from the client device to set the starting instruction block to the entry point at the beginning of the IVR workflow.

19. The computer system of claim 15, wherein the first instruction block is within an interactive voice response (IVR) workflow, wherein the computer system is further to:
receive a notification from a client device that the first instruction block is a selected instruction block in the GUI;
send a notification to the client device to request a starting instruction block to execute in the IVR workflow; and
receive a confirmation from the client device to set the starting instruction block to the selected instruction block.

20. The computer system of claim 15, wherein the first instruction block is within an interactive voice response (IVR) workflow, wherein the computer system is further to:
identify a first environmental parameter for the first instruction block;

sending a notification to a client device to provide a value for the first environmental parameter;
receive the value for the first environmental parameter; and
store the value for the first environmental parameter.

* * * * *